United States Patent [19]

Regan et al.

[11] Patent Number: 4,975,238

[45] Date of Patent: Dec. 4, 1990

[54] CONTROL SYSTEM FOR A NUCLEAR STEAM POWER PLANT

[75] Inventors: Jennifer A. Regan, Alexandria, Va.; Herbert Estrada, Jr., Annapolis, Md.

[73] Assignee: MPR, Inc., Washington, D.C.

[21] Appl. No.: 239,309

[22] Filed: Sep. 1, 1988

[51] Int. Cl.$^5$ .............................................. G21C 7/36
[52] U.S. Cl. .................................. 376/216; 376/215; 376/219; 364/494
[58] Field of Search ............... 376/211, 215, 216, 219; 364/494

[56] References Cited

U.S. PATENT DOCUMENTS

| | | | |
|---|---|---|---|
| 4,061,533 | 12/1977 | Durrant | 376/216 |
| 4,424,186 | 1/1984 | Cook | 376/211 |
| 4,651,530 | 3/1987 | Omori | 60/667 |
| 4,728,481 | 3/1988 | Geets | 376/216 |
| 4,738,818 | 4/1988 | Cantineau | 376/211 |
| 4,777,009 | 10/1989 | Singh | 376/211 |

OTHER PUBLICATIONS

"Operational Flexibility of B&W PWR Control Systems for Load Follow," D. J. Delano, American Nuclear Society, Eighth Biennial Topical Conference on Reactor Operating Experience, Chattanooga, Tennessee, Aug. 8-10, 1977, pp. 1-10.

"Steam/its generation and Use" (Babcock and Wilcox), 1975; pp. 35-19 to 35-24.

"Dynamic Behavior of the B&W Nuclear Steam System", Galan et al., American Nuclear Society Annual Meeting, Toronto, Canada, Jun. 13-18, 1976, pp. 1-10.

Primary Examiner—Donald P. Walsh
Attorney, Agent, or Firm—Epstein, Edell and Retzer

[57] ABSTRACT

A control system for a nuclear steam power plant having a reactor, one or more once through steam generators and a turbine includes a reactor control subsystem responsive to a power demand input to cause the reactor to deliver thermal power commensurate with the power demand input to the once through steam generator, one or more feedwater control subsystems sensing the thermal power delivered by the reactor to control feedwater flow to the once through steam generator, such as via a regulating valve and/or a feed pump, to match the thermal power delivered by the once through steam generator to the turbine with the thermal power delivered by the reactor, and a turbine steam demand control subsystem responsive to the thermal power delivered by the once through steam generator by sensing steam pressure to control a governor valve to admit steam to the turbine to cause the turbine operation to match the steam supplied by the once through steam generator such that the nuclear steam power plant is plant process controlled and constantly maintained in energy balance.

20 Claims, 16 Drawing Sheets

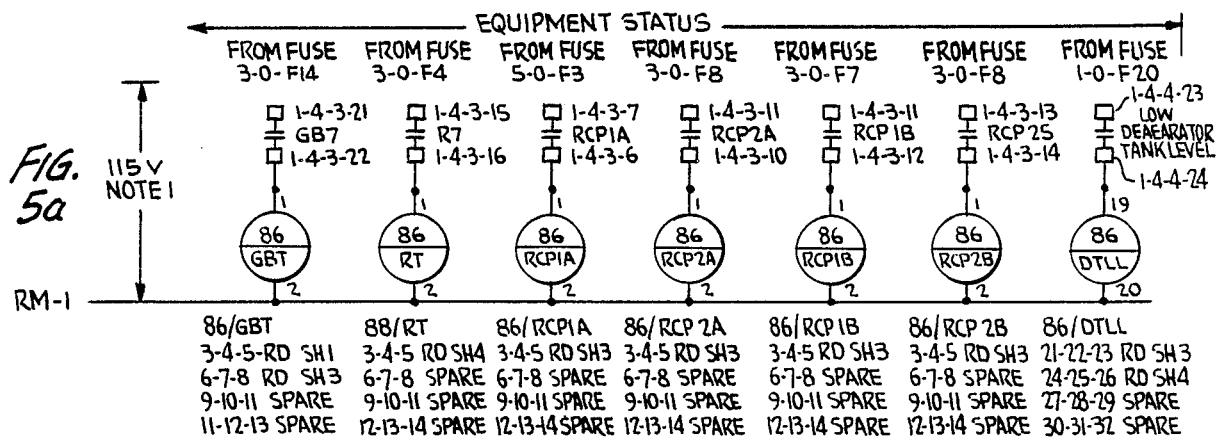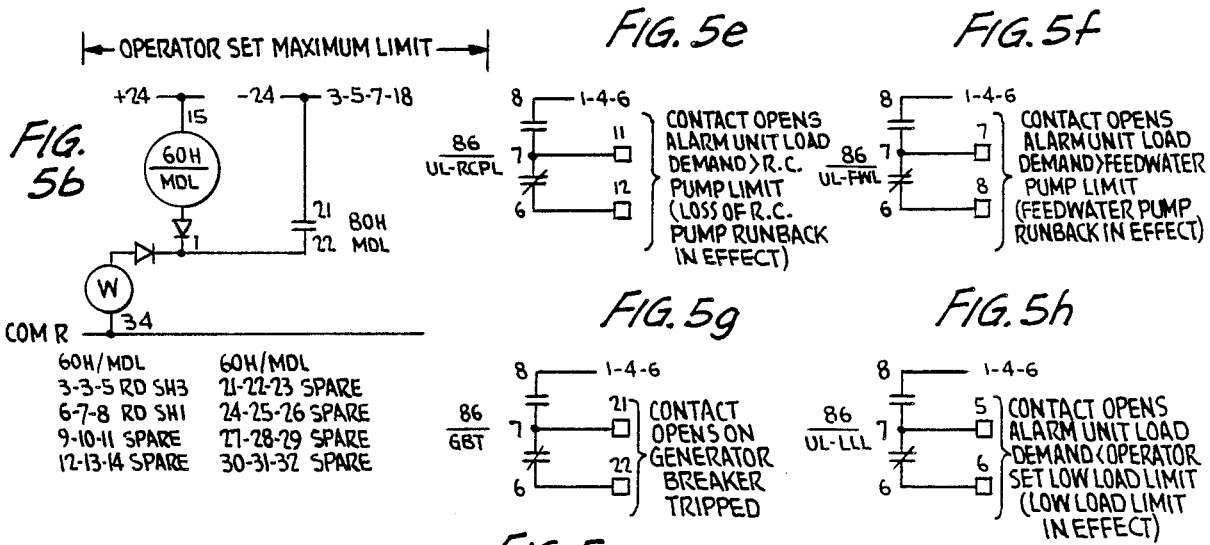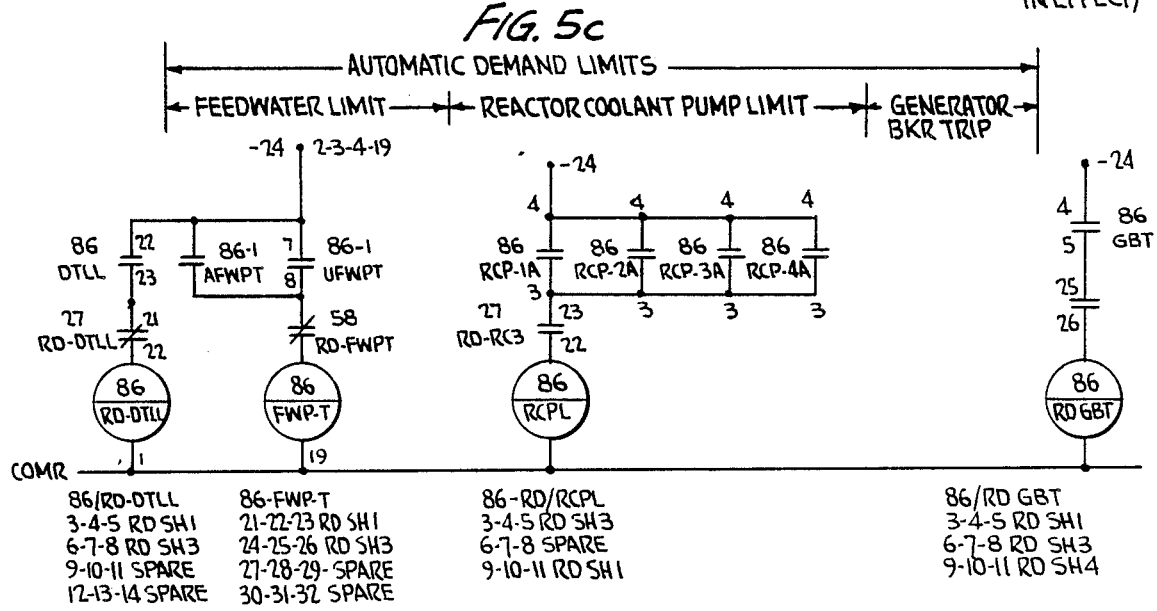

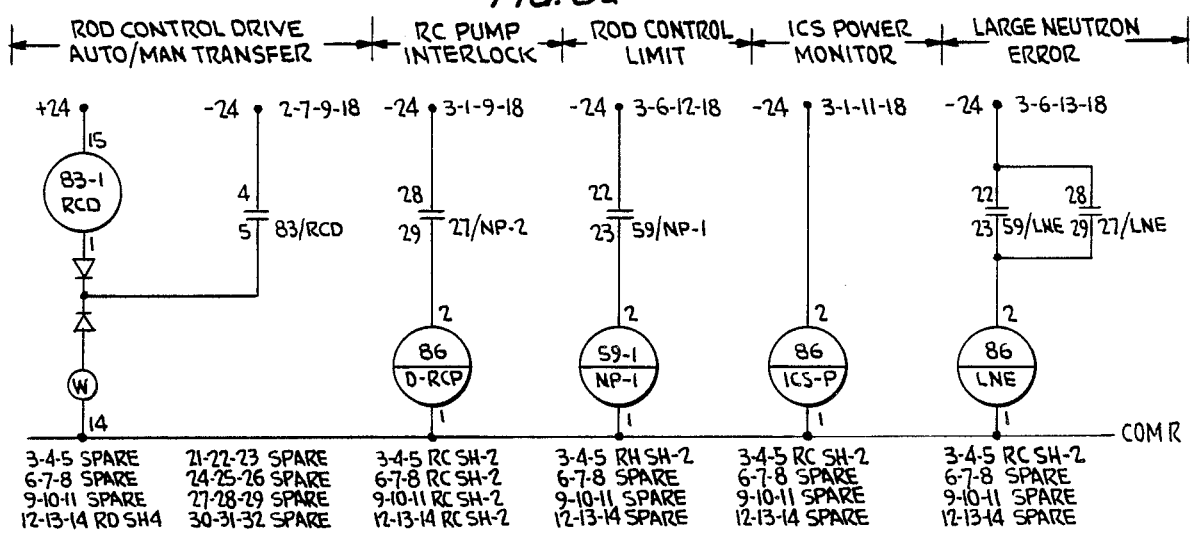
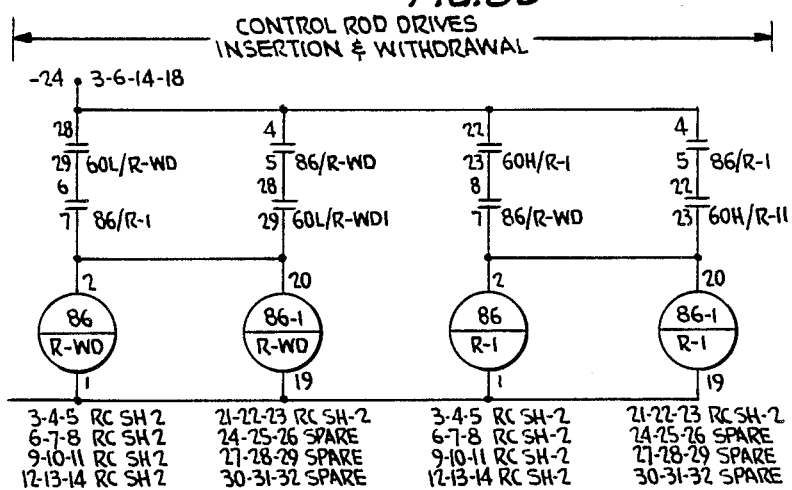
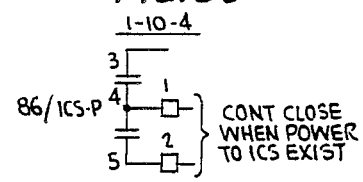
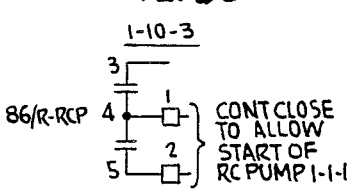
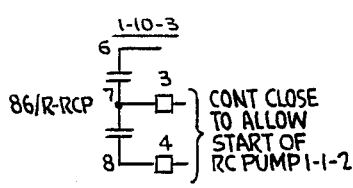
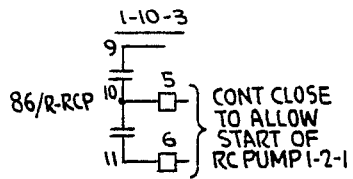
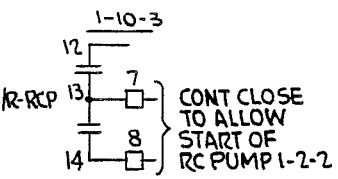
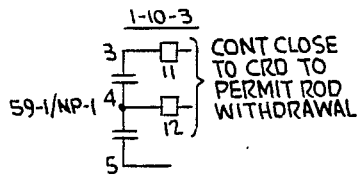
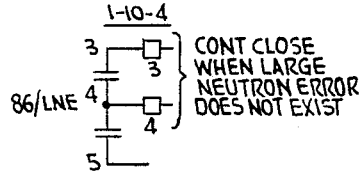
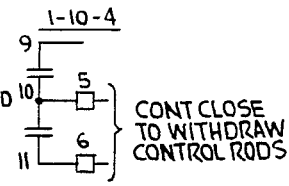

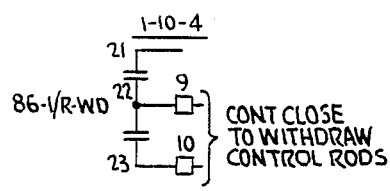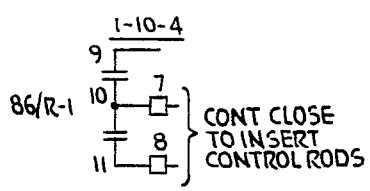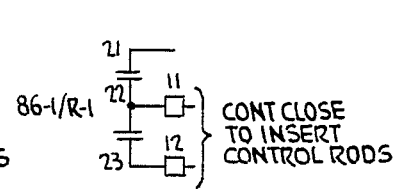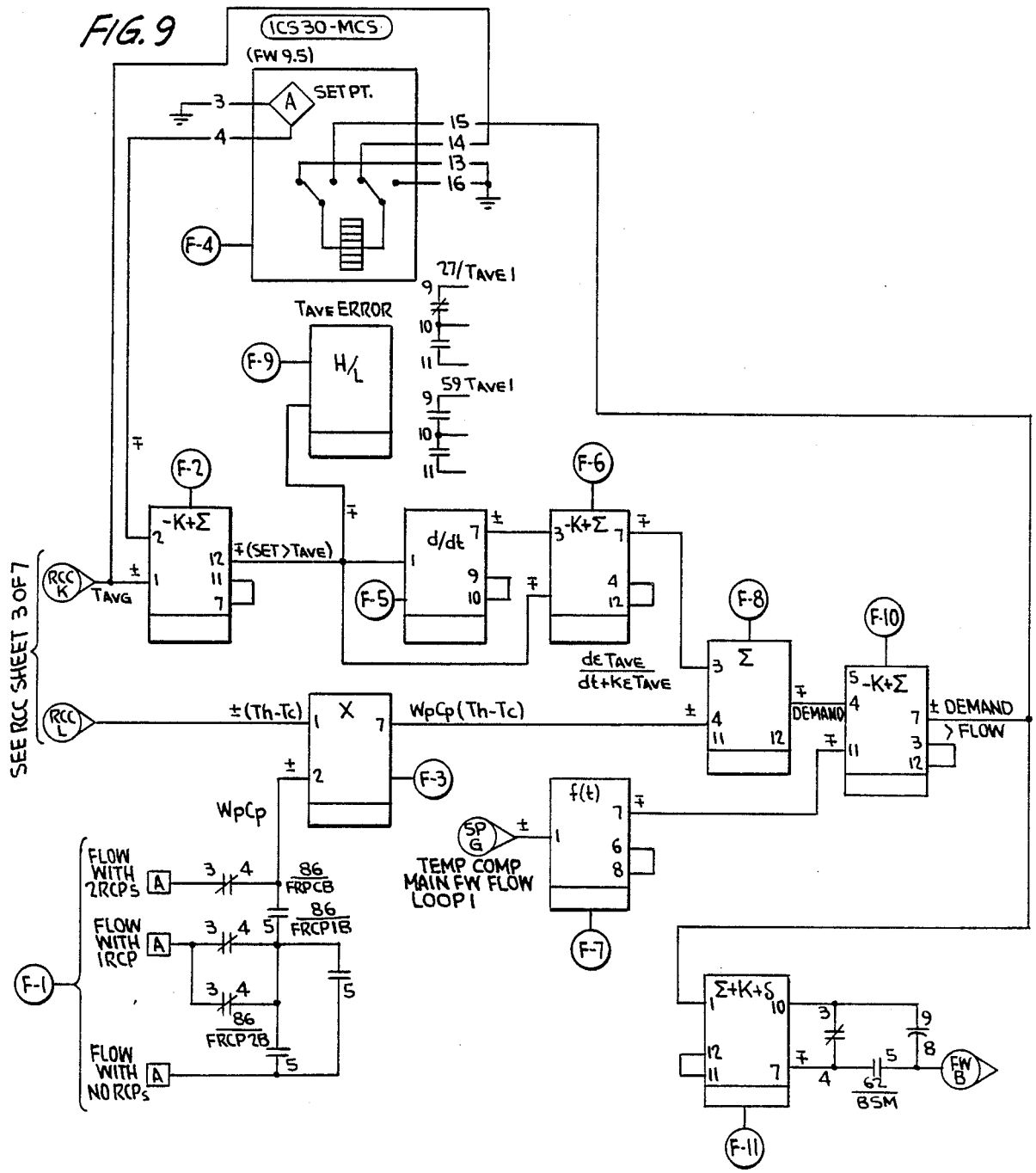

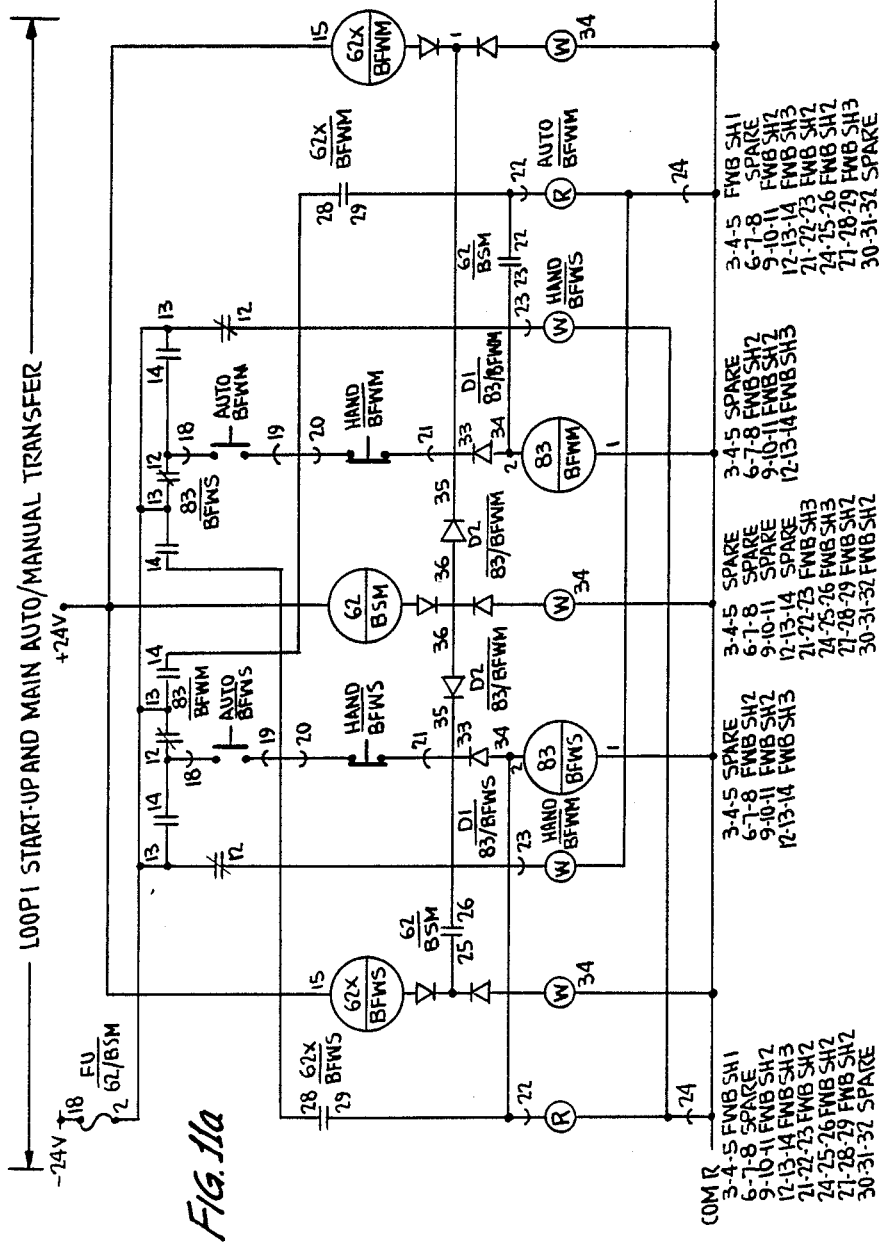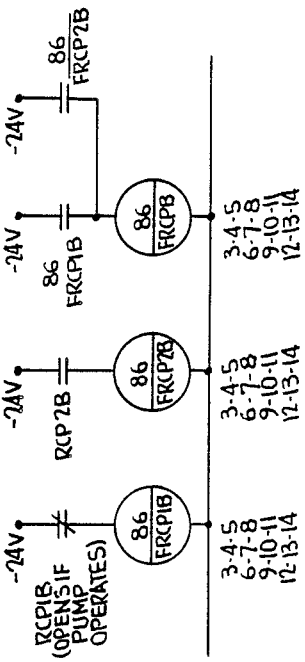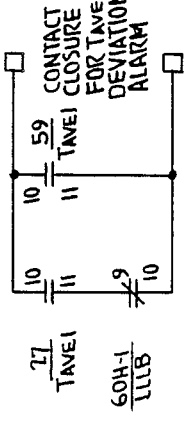
FIG.11a
FIG.11b
FIG.11c

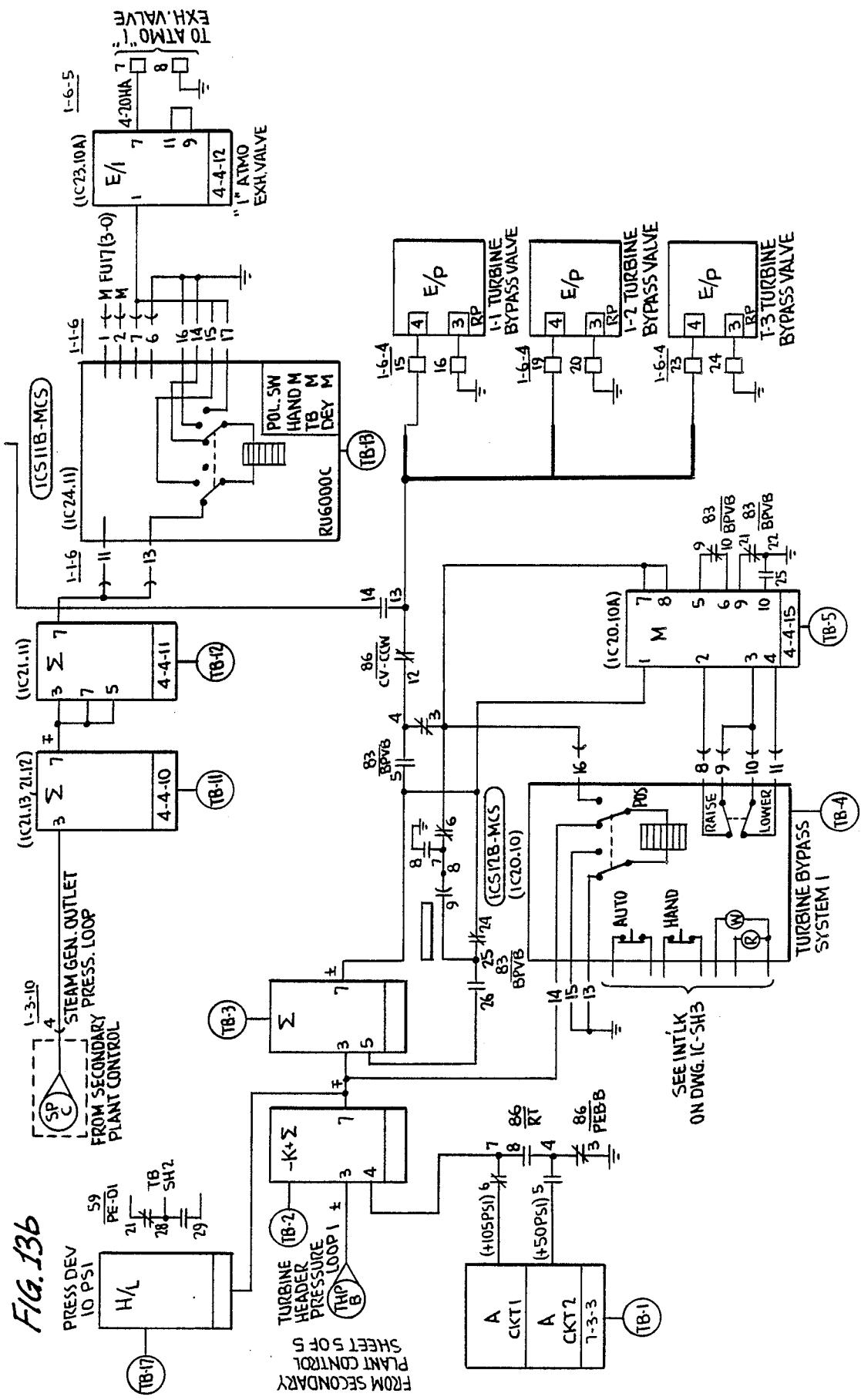

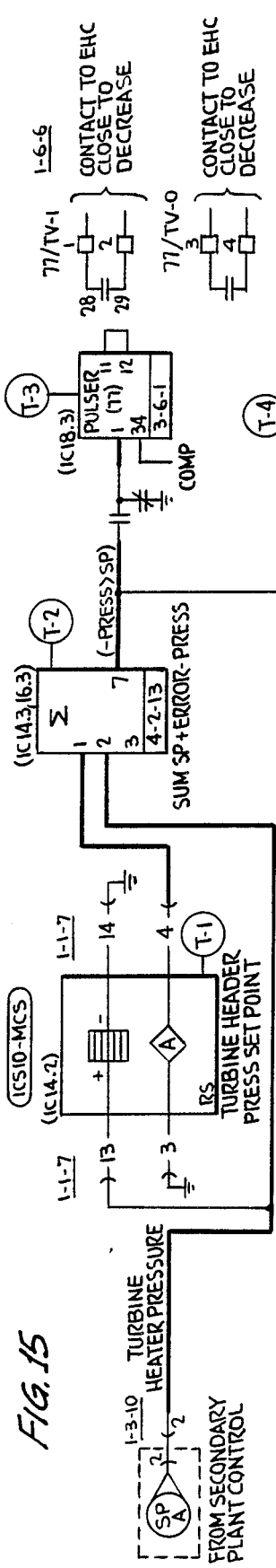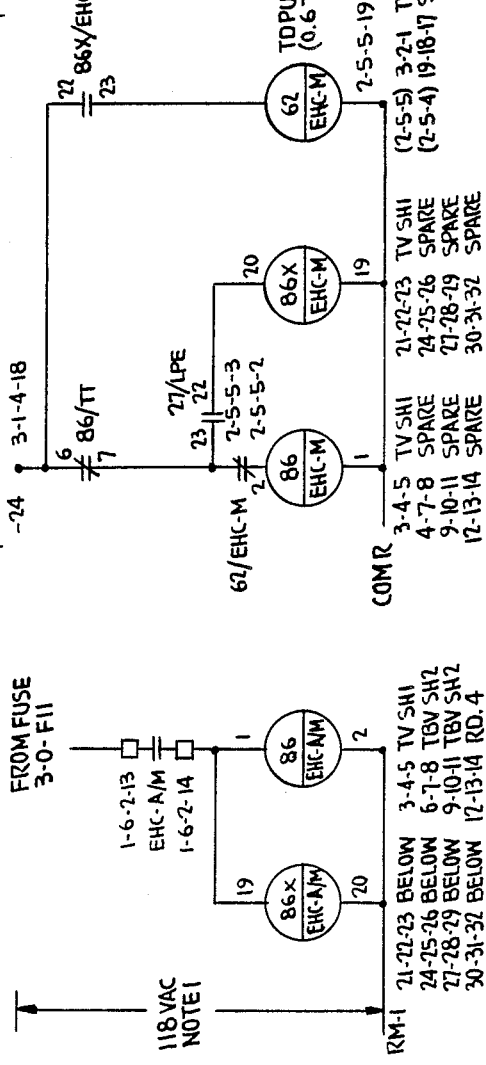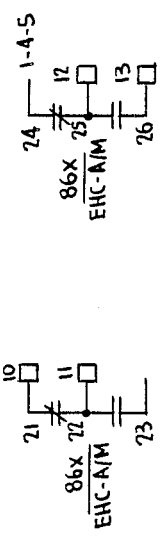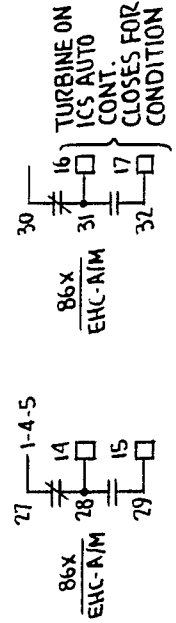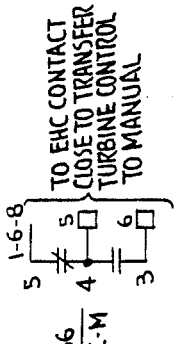

CONTROL SYSTEM FOR A NUCLEAR STEAM POWER PLANT

BACKGROUND OF THE INVENTION

1. Field of the Invention:

The present invention relates to control systems for nuclear steam power plants utilizing once through steam generators and, more particularly, to such control systems having independent control subsystems for reactor, feedwater and turbine steam demand control.

2. Background of the Invention:

Nuclear steam power plants utilizing once through steam generators for generating electrical power from nuclear energy conventionally utilize an integrated system of automatic controls for the reactor, the feedwater flow to the steam generator(s), and the turbine steam demand. Such integrated control systems operate effectively when properly aligned or "tuned" and when all components are functioning properly; however, when the systems become misaligned or a component fails, complicated transients, where more than one plant boundary condition responds spuriously, are generated which are difficult to control due to the complexity of the integrated control systems and the interaction of the various controls based on shared control system parameters. Other disadvantages of prior art integrated control systems for nuclear steam power plants are that, due to the complexity of such systems, plant operators are not able to fully understand the operation and, therefore, when failures occur such systems are shut down in favor of manual control, that additional manpower is accordingly required, and that it is difficult to determine the origin of system upsets leading to unnecessary confusion and system shut down.

The Babcock and Wilcox Integrated Control System, as described in a paper presented to the American Nuclear Society Annual Meeting, Toronto, Canada, June 13-18, 1976 entitled "Dynamic Behavior of the B&W Nuclear Steam System" and as implemented at the Davis-Besse Nuclear Power Station, is representative of prior art nuclear steam power plant control systems wherein subsystems for reactor,, steam generator/feedwater, turbine and turbine bypass controls, are interconnected to produce an integrated control for the plant, with control of each subsystem established from a central or integrated master.

SUMMARY OF THE INVENTION

Accordingly, it is a primary object of the present invention to overcome the above mentioned disadvantages of the prior art by providing a simplified control system for nuclear steam power plants utilizing once through steam generators that can be more easily understood by plant operators and is not capable of generating complex transients while maintaining full, complete and efficient plant control.

Another object of the present invention is to control a nuclear steam power plant utilizing a once through steam generator based on the thermal power delivered to the once through steam generator by reactor coolant as represented by coolant flow and coolant temperature difference in the hot and cold pipes ($T_H-T_C$) with a time derivative compensation based on average coolant temperature.

Another object of the present invention is to prevent the generating of complex transients in a nuclear steam power plant control system while also reducing the probability of feedwater upsets without requiring replacement of existing hardware or substantial additional hardware.

An additional object of the present invention is to prevent a failure in a control subsystem from generating a signal to cause control variations in other control subsystems by causing the reactor control subsystem to respond only to operator input within established reactor demand limits, the feedwater control subsystem to respond only to thermal power generated by the reactor and the turbine steam demand control subsystem to respond only to steam header pressure from the steam generator.

A further object of the present invention is to monitor steam header pressure in a nuclear steam power plant to maintain the steam header pressure constant at a selected setpoint independent of other control subsystems.

In accordance with the present invention, a nuclear steam power plant utilizing a once through steam generator is controlled by separate and independent control subsystems for the principal nuclear steam power plant boundary conditions, i.e., reactivity, steam demand and feedwater flow to the once through steam generator. The control subsystems are not integrated in a master control but rather are designed in a manner such that the combined responses of the control subsystems are coordinated to produce desired overall plant responses to normal changes in power demand and upsets.

Some of the advantages of the present invention over the prior art are that comprehensive control is provided under all plant conditions with no capability of causing complex transients to be created upon malfunction, the control system is plant process responsive in that each control subsystem responds to operating conditions produced by the preceding plant process rather than to otherwise generated control signals, complexity of design and number of hardware components required are greatly reduced resulting in a substantial reduction in calibration, timing and general maintenance requirements, the separate and independent nature of the control subsystems allows plant operators to quickly and easily identify a failed control subsystem and take over with manual control of only the failed control subsystem, and incremental upgrading and modernization is facilitated in that the coordinated control system of the present invention can be digitized with power supplies upgraded in a phased manner due to the independent nature and limited function of the control subsystems.

The present invention is generally characterized in a control system for a nuclear steam power plant having a nuclear reactor, a once through steam generator, means circulating coolant between the nuclear reactor and the once through steam generator including a hot coolant pipe, a cold coolant pipe and coolant pump means, means supplying feedwater to the steam generator including feedwater flow regulating means for controlling feedwater supplied to the once through steam generator, a turbine driven by steam generated by the once through steam generator and means for supplying steam from the once through steam generator to the turbine including a governor valve for controlling the amount of steam supplied to the turbine, the control system including a reactor control subsystem including reactor demand means for receiving an input from an operator representative of a selected power demand for the nuclear steam power plant and producing an output representative of reactor demand required to achieve the selected power demand for the nuclear steam power plant, a rod control responsive to the reactor demand output from the reactor demand means to control operation of the nuclear reactor, and reactor demand limit means supplying an input to the reactor demand means to limit the reactor demand output; a feedwater control subsystem independent of the reactor control subsystem including means for controlling the feedwater flow regulating means to control the flow of feedwater supplied to the once through steam generator, temperature sensing means for sensing the temperature of coolant in the hot coolant pipe and the temperature of coolant in the cold coolant pipe, means for sensing operation of the coolant pump to produce a coolant flow signal and computing means responsive to the difference in the coolant temperatures in the hot coolant pipe and the cold coolant pipe and to the coolant flow signal to produce a thermal power delivered output to the feedwater flow regulating means such that the flow of feedwater to the once through steam generator is controlled in response to the thermal power delivered by the nuclear reactor; and a turbine steam demand control subsystem independent of the reactor control subsystem and the feedwater control subsystem including pressure sensing means for sensing steam pressure in the means for supplying steam to the turbine and means for controlling the governor valve responsive to the steam pressure such that the operation of the turbine is controlled in response to the steam pressure and, therefore, operation of the once through steam generator whereby the feedwater control system controls feedwater flow to match the thermal power delivered by the once through steam generator to the thermal power delivered by the nuclear reactor independent of the reactor control subsystem by controlling the feedwater flow regulating means and the turbine steam demand control subsystem controls turbine steam admission in accordance with the steam pressure independent of the reactor control subsystem and the feedwater control subsystem.

Other objects and advantages of the present invention will become apparent from the following description of the preferred embodiment taken in conjunction with the accompanying drawings.

BRIEF DESCRIPTION OF THE DRAWINGS

FIGS. 9, 10 and 11(a–c) are schematic diagrams of circuitry for the feedwater control subsystem of the control system of the present invention.

FIGS. 15 and 16(a–j) schematic diagrams of circuitry of the turbine throttle control of the control system of the present invention.

DESCRIPTION OF THE PREFERRED EMBODIMENT

Figure 1:
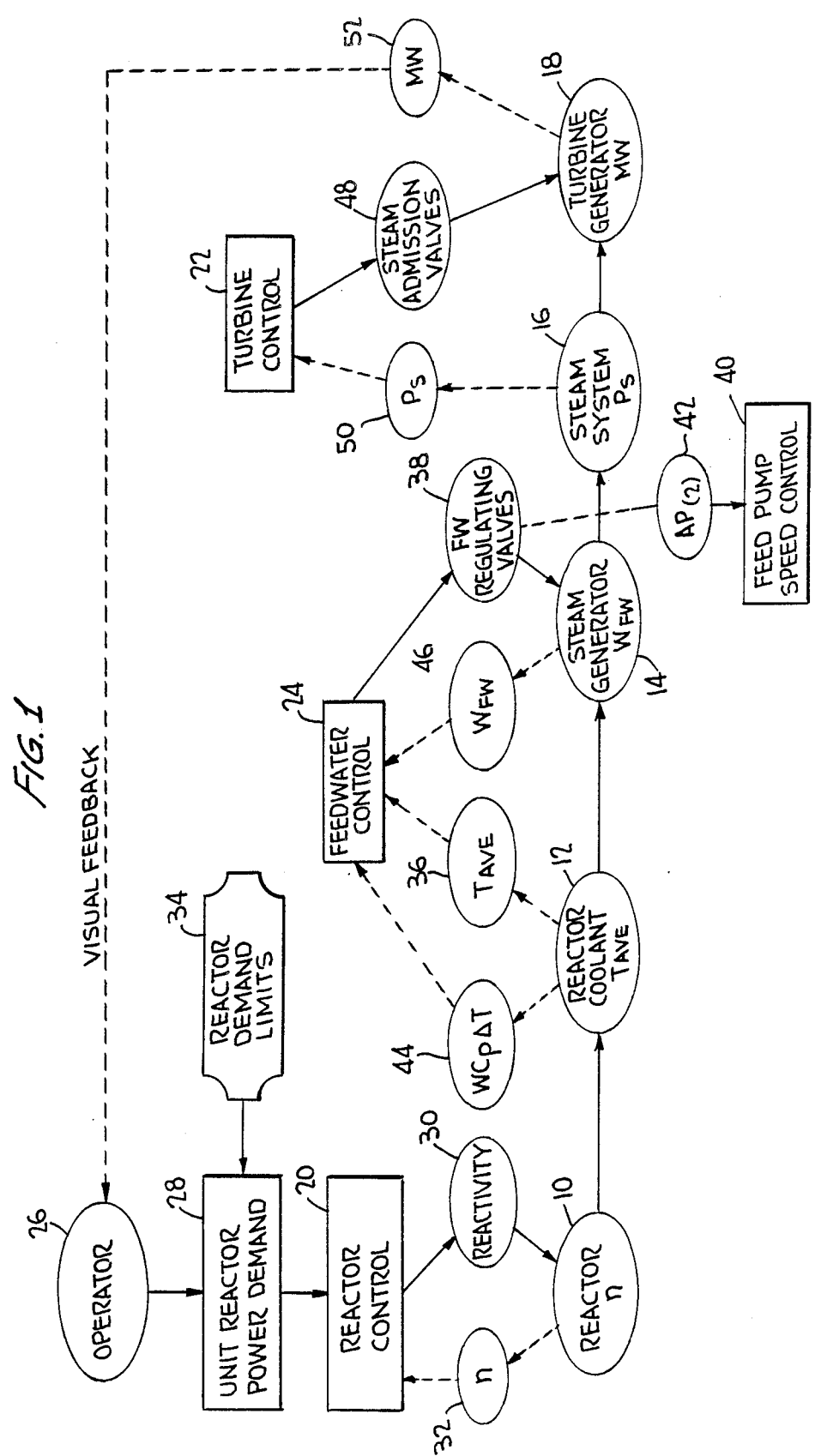
FIG. 1 is a block diagram of a control system for a nuclear steam power plant having a once through steam generator in accordance with the present invention.

A control system for a nuclear steam power plant in accordance with the present invention is illustrated in FIG. 1 relative to plant process energy flow wherein a nuclear reactor 10 generates thermal power which is transferred to reactor coolant 12 for storage and transport to a once through steam generator 14 where the thermal power generates steam which is stored and transported in a steam system 16 for supply to a turbine generator 18 that generates electricity as it is driven by the steam. The control system of the present invention is designed to regulate energy flow from the nuclear reactor to the turbine generator and is formed of separate and independent control subsystems for reactor control (reactivity) 20, for turbine control (steam demand) 22 and for feedwater control 24 including valve and/or feed pump speed controls. In practice, a nuclear steam power plant will normally have more than one once through steam generator operating with a single nuclear reactor, and the present invention will be described in detail for use in a nuclear steam power plant having two once through steam generators with a feedwater control subsystem for each steam generator, it being appreciated that the control system of the present invention can be used with nuclear steam power plants having one or more once through steam generators.

The control subsystems 20, 22, and 24 are separate and independent but cooperate in a manner such that the combined responses of the subsystems are coordinated to produce overall responses of the nuclear steam power plant to normal changes in power demand and to upsets, the subsystems being coordinated through the plant process with no interconnected master or integrated control. That is, rather than creating artificial demand signals for each control subsystem at a master control as in the prior art, the coordinated control system of the present invention relies on plant process operation for coordination of the control subsystems to produce a linear response with plant energy flow.

An operator at 26 sets unit reactor power demand at 28; and, contrary to prior art integrated control systems where a unit load demand is set and supplied as an input to each control subsystem via a master control, the unit reactor power demand is supplied only and directly to reactor control subsystem 20 which controls reactor 10 via a reactivity (rod) control 30 and a neutron power feedback 32 to produce a desired reactor power level in conventional fashion. Unit reactor power demand settings are limited by an input from a reactor demand limits module 34. Reactor power changes unaccompanied by feedwater changes cause a mismatch between thermal power (heat) generated by the reactor and thermal power absorbed by the steam generator 14 manifested by a change in the average temperature, $T_{AVE}$, of the reactor coolant sensed at 36 and supplied to feedwater control subsystem 24 which controls feedwater regulating valves 38 to match feedwater flow to steam generator 14 to reactor power while feed pump speed is controlled at 40 by sensing at 42 the differential pressure across the feedwater regulating valves. The reactor coolant 12 is monitored at 44 to supply a thermal power delivered signal ($WCp\Delta T$) where W is a coolant flow signal synthesized from reactor coolant pump circuit breaker positions (open-closed), #/seconds, Cp is the specific heat of the reactor coolant, taken to be constant, BTU/#/°F., (# represents mass of coolant in pounds) and ΔT is the difference in temperature between hot coolant leaving the reactor and cold coolant entering the reactor, $T_H - T_C$, °F. Feedwater control subsystem 24 also receives an input $W_{FW}$ from 46 representative of actual feedwater flow to once through steam generator 14. Thus, it will be appreciated that the control subsystem feeds the once through steam generator until the power output of the once through steam generator matches reactor power input to the once through steam generator. The turbine steam demand control subsystem adjusts the positions of steam admission valves 48 (including governor, dump and bypass valves) to maintain turbine header pressure and, thus, steam generator pressure sensed at 50 at a preselected value, and the output power of the turbine at 52 is visually monitored by the operator.

More particularly, the reactor control subsystem 20 matches the thermal power generated by the reactor to the power demand input at 28 by the operator, the input power demand being automatically modified via reactor demand limits module 34 to be compatible with the capabilities of the nuclear steam power plant and the control system whereby the minimum power demand is set so that control of the plant will be maintained stably by the control system while operation at power lower than minimum (about 10%) requires manual control of the reactor control subsystem. An absolute maximum power demand is also set; and, if there is a failure in the feedwater supply, such as one or more feed pumps being inoperative, the demand is limited so as not to exceed the steam delivery capacity of the steam generators under these conditions. If one or more reactor coolant pumps are inoperative, demand is limited in accordance with the ability of the remaining flow to remove reactor heat. When the generator load is rejected, demand is set at low power so that the reactor will run back at maximum rate to avoid trip on high reactor pressure. More particularly, the reactor demand limits are of either an automatic or manual nature. Manual limits are set by the operator to limit the range in which thermal power can be maneuvered while automatic limits are set by relays which detect the state of key pumping systems in the plant, the reactor coolant pumps and the feedwater pumps. The maximum demand that the control system can impose on the plant, and, therefore, the maximum thermal power that the control system can cause the reactor to generate, is limited by the automatic reactor demand limits to not exceed the capabilities of either the coolant or feedwater pumping systems to deliver the flows needed to transport thermal power. Examples of manual reactor demand limits include maximum power and minimum power while examples of automatic reactor demand limits include electrical generator over-heating, deaerator level, coolant pump state, feed pump state, load rejection and turbine trip.

The state of the coolant pumps is detected by relays that follow the state of each circuit breaker which controls the flow of electrical power to a coolant pump. If the breaker is open, the pump is not operating; and, if the breaker is closed, and remains closed, the pump is operating, it being noted that a mechanical malfunction of the pump will cause a motor overload and, therefore, a breaker trip or opening. Contacts from the pump follower relays are arranged in such a manner that when a first contact closes any two of four pumps are operating, when a second contact closes any three of four pumps are operating and when a third contact closes all four pumps are operating. The contacts are arranged to provide a voltage proportional to the maximum allowable thermal power for the number of pumps in operation to produce the concomitant reactor demand limit.

The states of the feedwater pumps are detected by relays which follow the state of each of the feedwater pump master trip relays such that, if the master trip relay is in a tripped state, the pump is not operating and, if the master trip relay is not in a tripped state, the pump is operating. The feed pump follower relays are arranged in a manner similar to that described above with respect to the coolant pumps to provide a voltage proportional to the maximum allowable thermal power for the number of pumps in operation for use as a reactor demand limit. The deaerator tank, which is the source of water for the feedwater pumps, has a relay that is actuated on low level therein to automatically set a reactor demand limit until the level in the deaerator tank increases.

The reactor control subsystem operates as a bang-bang (on-off) control to insert or withdraw rods according to the function:

Rod position demand = reactor demand − neutron power or:

EKROD = MWDRX − QFUEL/FPQR.

Where:
MWDRX = reactor demand as a fraction of full power, set by operator.
QFUEL = neutron power
FPQR = full power value of neutron power.

If EKROD exceeds a preset threshold and is positive, rods will be withdrawn at a controlled rate. If EKROD exceeds a preset threshold and is negative, rods will be inserted at a controlled rate.

With respect to the feedwater control subsystem, during normal operation at power, the feedwater flow control subsystem controls the flow of feedwater to its once through steam generator such that the through flow is sufficient to carry off the thermal power delivered to each steam generator by the reactor coolant system. When two once through steam generators are used, two independent feedwater control subsystems are used, one for each steam generator. The feedwater demand is made up of two components:

1. A "thermal power delivered" term, the product of (a) the difference in the hot and cold leg temperatures for the coolant loop in which the once through steam generator is located and (b) a flow signal synthesized from the circuit breaker positions (open-closed) for the coolant pump in the loop in which the once through steam generator is located. The "thermal power delivered" term could also be determined from neutron flux; however, determining "thermal power delivered" from the coolant is preferred because it provides a more direct indication of the plant process of delivering thermal power to the once through steam generator.

2. A term dependent on the deviation of coolant average temperature in the loop of the steam generator having two components:

a term proportional to the deviation of average coolant temperature from setpoint, and a term proportional to the time-rate-of-change of the deviation of average coolant temperature from setpoint. Since the setpoint does not change in time, this term can be formed simply of the time-rate-of change of the average coolant temperature without altering operation of the system.

Mathematically, feedwater control for each once through steam generator in the normal operating range (that is, not in high - or low-level limits range) can be expressed as:

$$WFWD = (WCp\Delta T/QSGO + K_f(E_t + T_t\, d/dt\, (E_t))) * FPWFW$$

Where:

WFWD = feedwater demand signal, #/sec.
FPWFW = equivalent full power feed flow, #/sec.
W = coolant flow signal synthesized from reactor coolant pump circuit breaker positions (open-closed) in the loop being controlled #/sec.
$C_p$ = Specific heat of reactor coolant, taken to be constant, BTU/#/°F.
$\Delta T = (T_H - T_C)$ in the loop of interest, °F.
QSGO = Rated steam generator power, BTU/sec.
$K_f$ = gain of average temperature component of demand, per unit/°F.
$E_t = T_{set} - (T_H + T_C)/2.0$ in the loop being controlled, where Tset is the average temperature setpoint, constant.
$T_t$ = Derivative time constant to offset the time constant in the resistance thermal detectors used to measure $T_H$ and $T_C$ and the thermal time constant of the reactor coolant system.
$d/dt(E_t)$ = The time-derivative of the average temperature signal, $E_t$.

The steam generator feedwater demand WFWD is compared with actual feedwater flow, WFW, and the resulting feedwater flow error is operated on by a conventional proportional plus integral controller to produce a feedwater regulating valve position demand. The output of the integral portion of the controller is limited to prevent "windup" when a flow error persists.

When unlimited, the controller output is expressed mathematically as:

$$Y_d = K_{fw} * E_{fw} + (K_{fw}/TAU_{fw}) \int E_{fw}\, dt$$

Where:

$Y_d$ = Demanded position of the feedwater regulating valve, per unit.
$K_{fw}$ = Feedwater controller gain, per unit valve position/feed error.
$E_{fw}$ = WFWD − WFW, feedwater flow error, #/sec.
$TAU_{fw}$ = Integrator time constant, seconds.

Under normal operating conditions, this valve positive demand is fed to the feedwater regulating valve positioner to regulate feedwater flow.

When the plant is operating at low power (below about 30%), a requirement to maintain a minimum fluid inventory in the once through steam generator overrides the requirement to control reactor coolant average temperature. To accommodate this requirement, both the valve position demand from the normal feedwater flow controller and a position demand generated by a level controller are input to a high signal select module. The valve position demand from the level controller is proportional to the steam generator start-up range level deviation from setpoint.

This can be expressed mathematically as:

$$Y_{dl} = K_l(LEVMIN - LEVM)$$

Where:

$Y_{dl}$ = feedwater regulating valve position demanded by the low level controller, per unit.
$K_l$ = low level controller gain, per unit valve position/inches level error
LEVMIN = Minimum level setpoint, inches
LEVM = Measured level, lags level with a one second time constant The high signal selector is described by:

If $Y_d > Y_{dl}$, THEN $Y_d = Y_{dl}$

Accordingly, when the position demand generated by the flow controller falls below that of the level controller, the level controller assumes control of the regulating valve by means of the high-select module to maintain a minimum fluid inventory in the steam generator. A high level limiting feature is not automatically incorporated, but rather the operator responds to a high level alarm to reduce reactor power and, thus, feedwater flow until the once through steam generator levels falls below the maximum setpoint.

A feed pump control provides a speed demand input for each feed pump turbine governor where separate piping and components are provided for each once through steam generator. Each speed demand signal is generated by a controller whose output is proportional to the deviation from setpoint of the differential pressure across each of the feedwater regulating valves. For example, for each feed pump, $$OMEGD = K_{dp} * (DPSET - DPY) + OMEGB$$

Where:

OMEGD = Demanded speed for the feed pump, RPM
$K_{dp}$ = Speed controller gain, RPM/psi
DPSET = Differential setpoint for regulating valve psi
DPY = Actual differential pressure across feed regulating valve
OMEGB = A reference or nominal feed pump speed demand The proportional control (i.e. no integrating feature) allows stable and independent control for the speed of the feed pumps.

When the main feedwater pumps are arranged one each to a steam generator, recourse to a regulating valve to control feedwater flow is optional. Alternately, the speed of each feed pump may be regulated to control the flow of feedwater to the associated steam generator. For this arrangement, the feed pump speed demand is expressed mathematically as:

$$OMEGD = K_{fwp} * E_{fw} + (K_{fwp}/TAU_{fwp}) \int E_{fw}\, dt + OMEGB$$

Where:

$K_{fwp}$ = feed pump controller gain per unit speed demand/#/sec feed error
$TAU_{fwp}$ = feed pump controller integrator time constant, sec In such a system, a regulating valve is provided for the control of feedwater flow at low power levels. As power increases, and the flow demand reaches the capacity of the regulating valve, the valve is bypassed by means of an automatically opened gate valve, whereupon control of feedwater flow is ceded to the feed pump speed control described above. The control method for the regulating valve in this arrangement will include an auctioneered valve position demand, as described previously. The auctioneer will select the higher of a feedwater flow controller position demand and a low level controller position demand, also in the manner described previously.

Where common piping and components are provided for the once through steam generators, a single feed pump control provides a speed demand input to the feed pump turbine governors. Each valve DP signal is compared by an auctioneer whose output is the lesser DP. The lesser DP signal is supplied to a proportional controller whose output is proportional to the deviation from setpoint of the lesser differential pressure across the two feedwater regulating valves:

$$OMEGD = K_{dp} * (DPSET - DPY) + OMEGB$$

Where:
$OMEGD$ = Demanded speed for the feed pump, RPM
$K_{dp}$ = Speed controller gain, RPM/psi
$DPSET$ = Differential setpoint for regulating valve, psi
$DPY$ = Actual differential pressure across feed regulating valve, lesser of each valve DP.
$OMEGB$ = A reference or nominal feed pump demand The turbine steam demand control subsystem adjusts the position of the turbine steam admission valves to maintain the pressure of the steam generator at a preselected value (setpoint). Under normal operating conditions at power, control is exercised through the pulser, controlling the position of the main turbine speed changer motor. This can be expressed as:

$$d/dt(Y_{td}) = K_p (P_{sg} - P_{sgset})$$

Where:
$Y_{td}$ = Speed changer position per unit
$K_p$ = Steam demand controller gain, per unit valve position per pressure error, psi
$P_{sg}$ = Steam generator pressure, psia
$P_{sgset}$ = pressure setpoint, psia If main turbine steam demand is not sufficient to consume the steam supplied by the steam generators, supplementary steam demand is provided by turbine bypass and atmospheric dump valves. The position of the bypass valves is made proportional to the deviation of turbine header pressure from its desired value (setpoint). This turbine bypass valve setpoint is dependent on the operating condition of the plant. If the turbine is in manual, or is not synchronized, the setpoint is at nominal operating pressure. If the turbine is synchronized and the reactor is not tripped, the setpoint is a small increment above the nominal operating pressure (about 5%). If the reactor is tripped, the setpoint is set at a larger increment above nominal operating pressure and, specifically, at the desired post-trip steam pressure.

$$YTBYS = (PSG - PTBY)/PB$$

Where:
$YTBYS$ = turbine bypass valve position demand, per unit
$PTBY$ = turbine bypass valve setpoint, psi
$PB$ = proportional band (nominally 2 to 3% of nominal operating pressure)

A similar equation is used for the atmospheric dump valves, which operate on the basis of steam generator pressure error. Their setpoint is not changed with reactor or turbine operating condition. The proportional control of the turbine bypass and atmospheric dump valves is designed to limit the excursions in reactor coolant temperature after a trip and to provide margin between steam pressure under post-trip conditions and safety valve setpoints.

With steam demand control based on steam pressure only, the turbine will generate the megawatts necessary to maintain steam pressure, megawatt demand being satisfied by visual feed back from a display on a control room indicator. The operator can manually adjust reactor demand to increase or decrease reactor power. The feedwater control subsystem automatically adjusts to match the reactor power by sensing the reactor coolant temperature, and the steam flow/feed flow mismatch in the once through steam generators cause tube wetted surface to change thereby causing steam pressure to change, altering steam flow and, thus, the megawatts generated by the turbine.

Accordingly, it will be appreciated that in operation of the coordinated control system of the present invention, the operator sets a power demand, and the feedwater control subsystem and the turbine control subsystem each operate by sensing upstream plant process operation such that, rather than a master control receiving the unit load demand and establishing demand signals for each of the control subsystems, as in the prior art, once the power demand is set the control subsystems respond to plant conditions. Thus, while prior art control systems must switch modes of operation due to the artificial nature of the demand signals from the master control (i.e., based on assumed plant operation rather than actual plant operation) in order to adjust for different responses required of the reactor and feedwater subsystems during off-normal conditions, the coordinated control system of the present invention is designed to allow automatic or following action by each subsystem, not limited by a master control signal. Thus, the feedwater control matches reactor power, rather than an artificial master demand signal, and quick response of the feedwater control requires no limiting since feedwater is matched with and corresponds to reactor power at all times. If feedwater capability is limited because of a feed pump trip, the automatic reactor demand limit from 34 will reduce reactor demand, and the operator can dial down neutron power demand to produce direct control over reactor operation with a single component signal. Upon any load rejection the reactor demand signal is set to 25% power, and the control subsystems follow due to the plant process response thereof. More particularly, in prior art integrated control systems, a BTU limit mode change is required to limit feedwater based on thermal power delivery of the reactor and feed systems, a rapid feed reduction is required to reduce feedwater flow following reactor trip, a cross limits mode change is required to cause neutron flux to follow feedwater (if feedwater is limited) and to cause feedwater to flow neutron flux (if reactor power is limited), and a tracking mode change is required to cause neutron flux and feedwater to follow generator output on load rejection; however, no mode changes are required in the coordinated control system of the present invention for such conditions.

The coordinated control system employs several automatic reactor demand limits, but no rate control is required between 25 and 90% power. For example reactor demand may be decreased immediately to 25% following a load rejection. Controlled runback rates, required in prior art integrated control systems, are not necessary for the coordinated control system, which simply sets reactor demand limits and relies on the natural maximum runback rate of the reactor since feedwater control follows the reactor and steam pressure follows feedwater.

Figure 2:
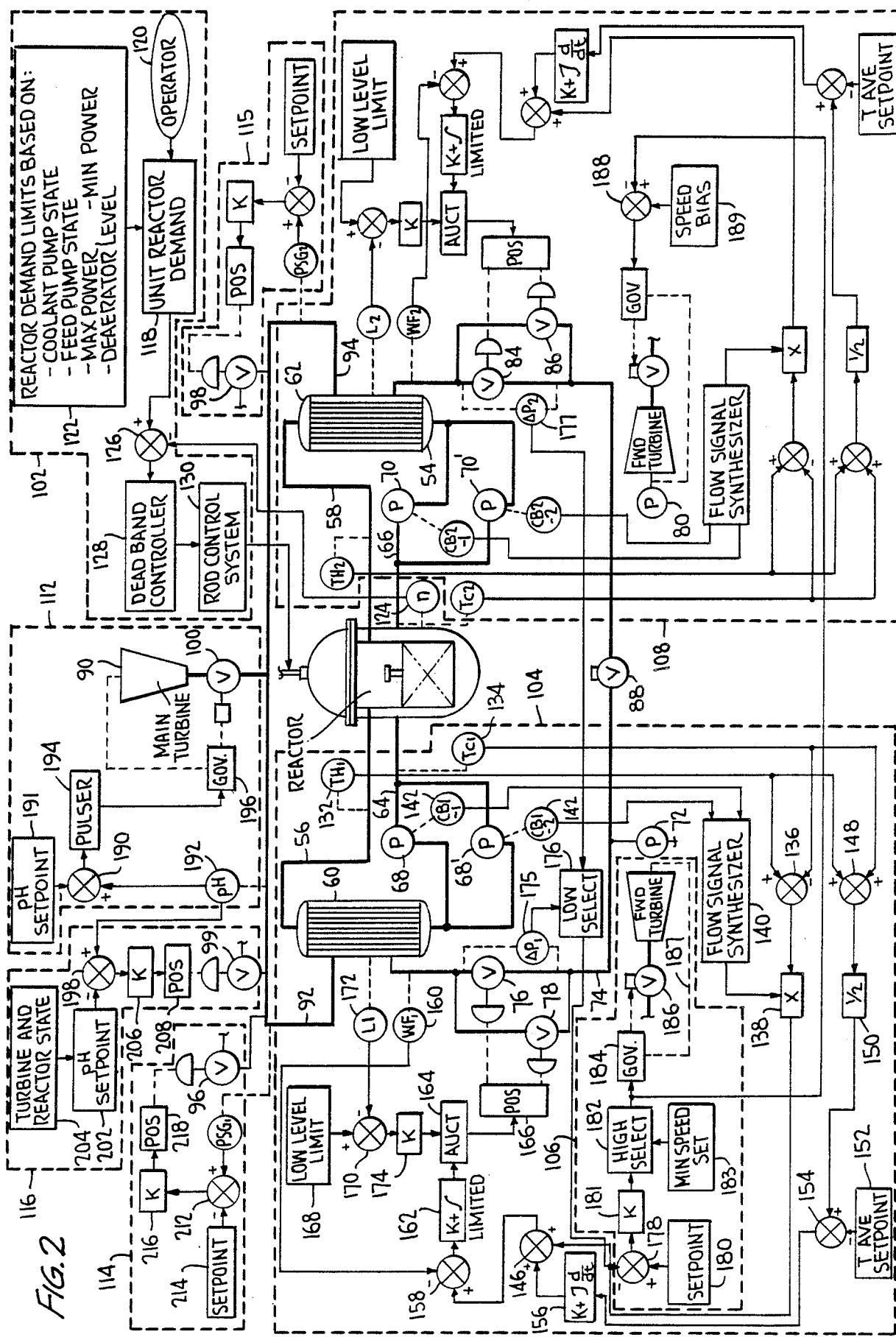
FIG. 2 is a diagrammatic representation of a control system in accordance with the present invention for use with a nuclear steam power plant having two once through steam generators.
Figure 3:
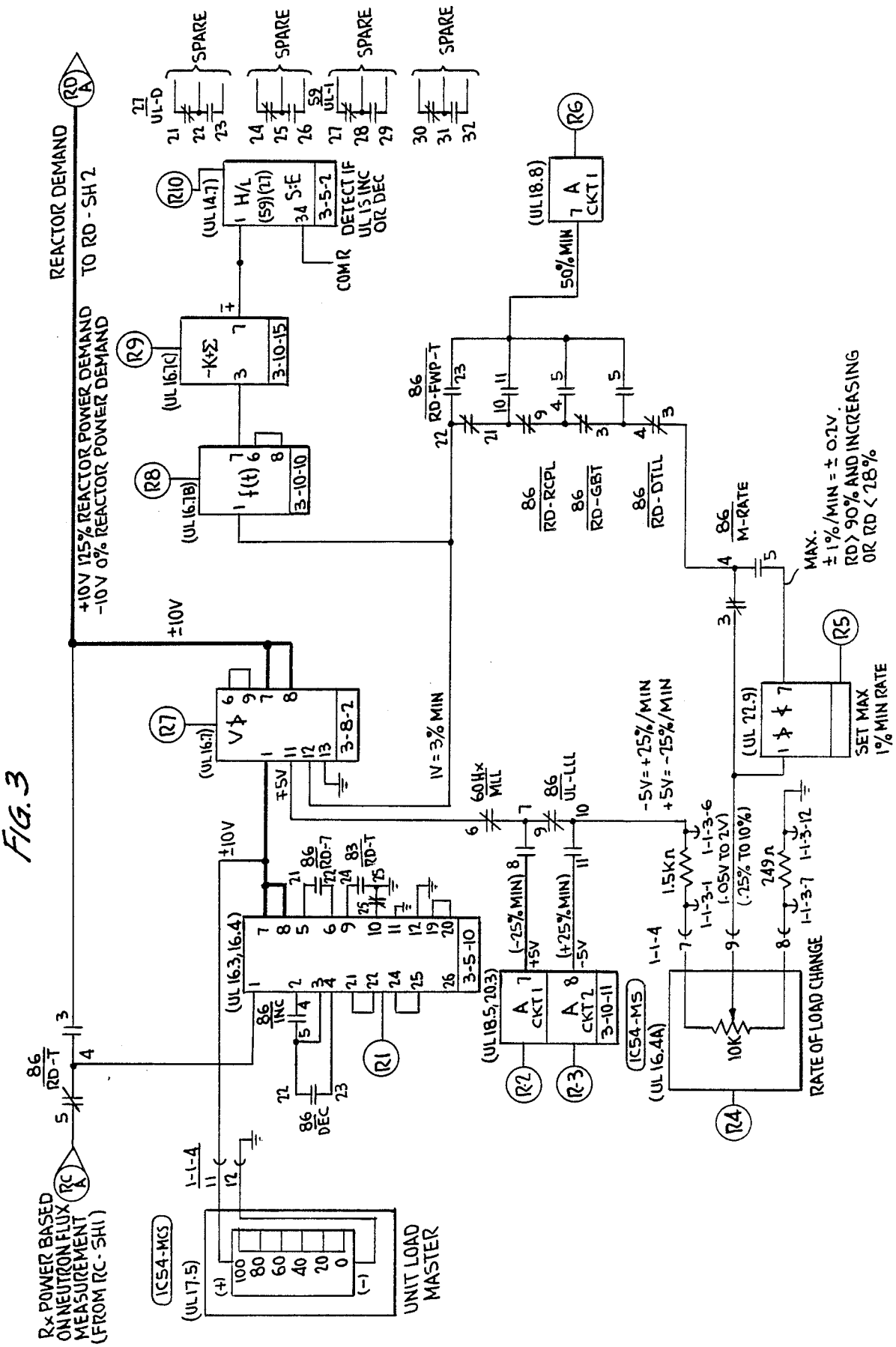
FIGS. 3, 4, 5(a–h), 6, 7 and 8(a–m) are schematic diagrams of circuitry for the reactor control subsystem of the control system of the present invention.
Figure 4:
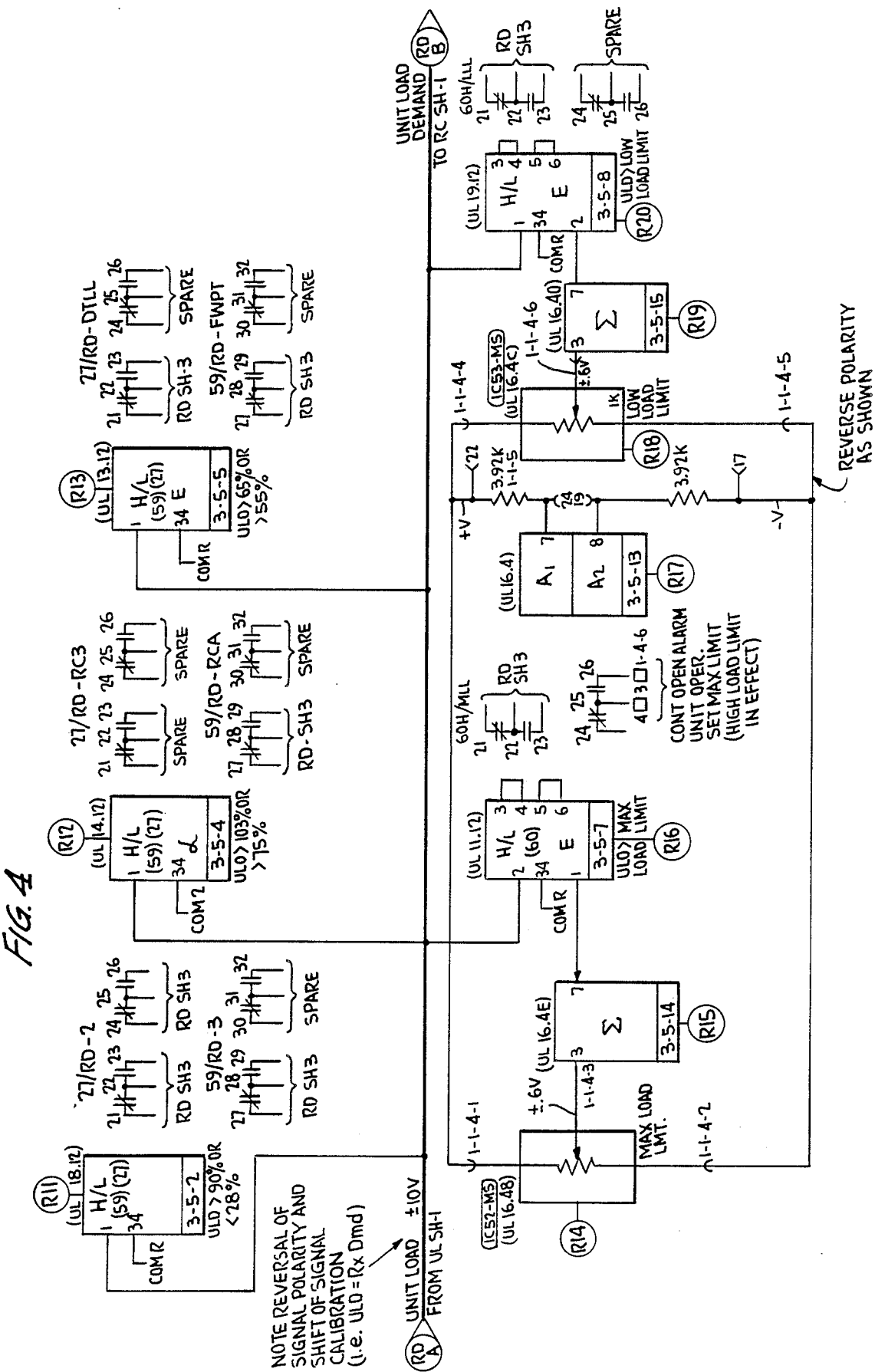
Figure 5D:
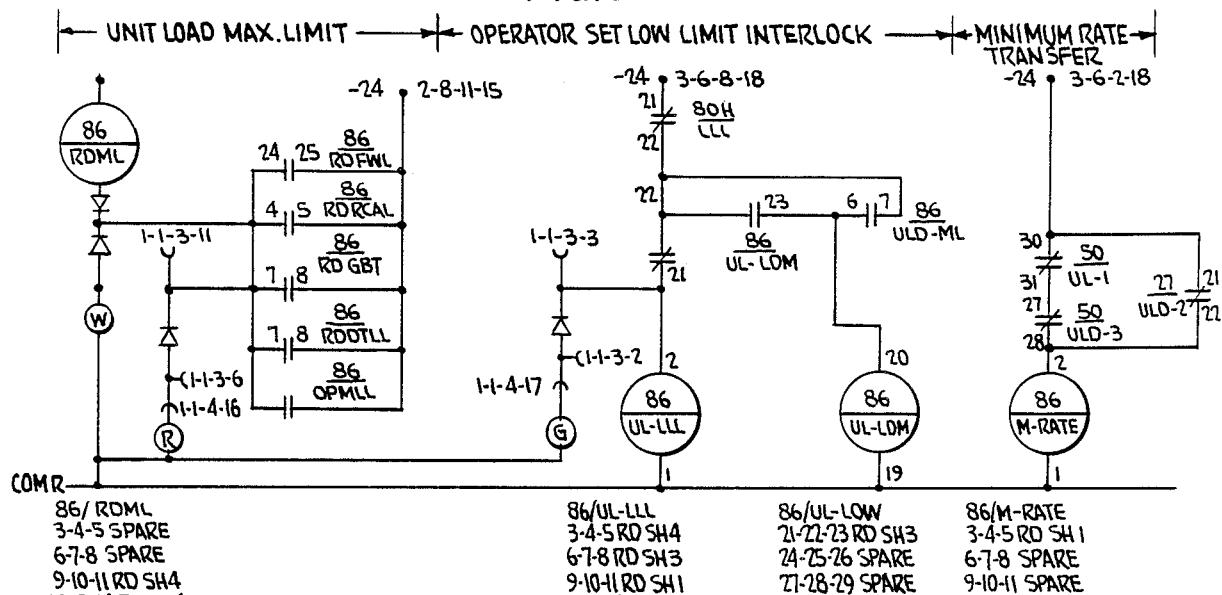
Figure 6:
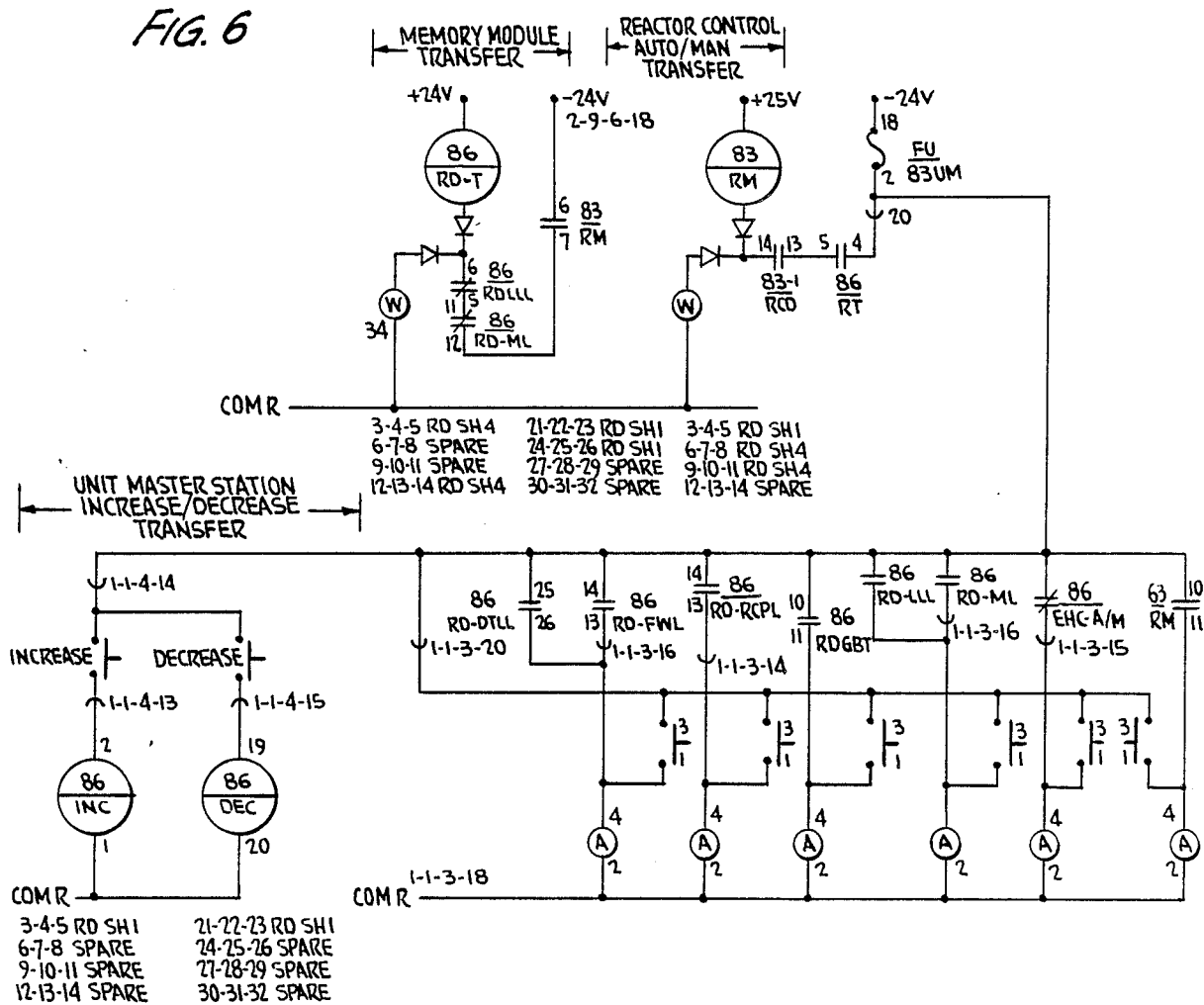
Figure 7:
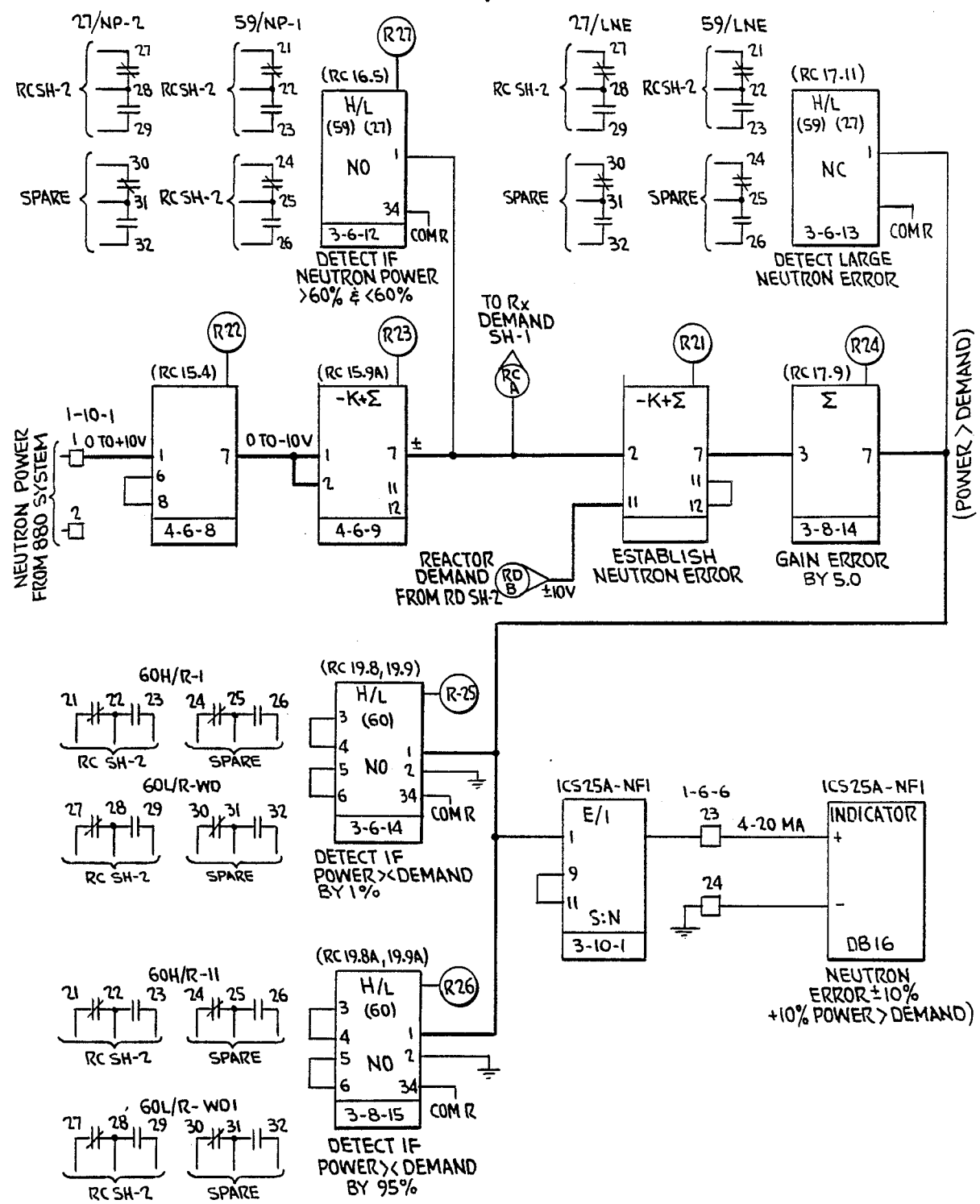

A coordinated control system according to the present invention for a nuclear steam power plant having two once-through steam generators and accompanying feedwater control subsystems is illustrated in FIG. 2, wherein plant process paths are indicated in heavy lines, control signal paths are indicated by light lines and sensed process variables and electro-mechanical links are indicated by dashed lines. The nuclear steam power plant is of conventional arrangement and including a nuclear reactor 54 having hot coolant outlet pipes 56 and 58 communicating with the inlets of once through steam generators 60 and 62, respectively, and cold coolant inlet pipes 64 and 66 communicating with the outlets of steam generators 60 and 62 with parallel pumps 68, 68' and 70, 70' in cold inlet pipes 64 and 66, respectively, to circulate coolant between the reactor and the steam generators. Feedwater is supplied to steam generator 60 via a turbine-driven pump 72 and an inlet pipe 74 having a main feedwater regulating valve 76 therein in parallel with a start-up feedwater regulating valve 78. Feedwater is supplied to steam generator 62 via a turbine-driven pump 80 and an inlet pipe 82 having a main feedwater regulating valve 84 therein in parallel with a start-up feedwater regulating valve 86, and a crossover valve 88 communicates with the main feedwater inlet pipes 74 and 82. Steam is supplied from steam generators 60 and 62 to a main turbine 90 via outlet pipes 92 and 94, respectively, and a turbine header 95, pipe 92 communicating with a steam dump valve 96, pipe 94 communicating with a steam dump valve 98 and header 95 communicating with a turbine bypass valve 99. A turbine governor valve 100 is positioned in the steam line leading to main turbine 90.

In accordance with the present invention, the coordinated control system includes a reactor control subsystem generally indicated at 102, a feedwater control subsystem for steam generator 60 generally indicated at 104 and including a feed pump speed control generally indicated at 106, a feedwater control subsystem for steam generator 62 generally indicated at 108 including a feed pump speed control generally indicated at 110, and a steam demand turbine control subsystem generally indicated at 112 and having an atmospheric dump valve control loop 114 associated with steam generator 60, an atmospheric dump valve control loop 115 associated with steam generator 62 and a turbine bypass control loop 116 associated with turbine header 95.

The reactor control subsystem 102 includes a unit reactor demand module 118 that receives manually set inputs directly from an operator at 120 and inputs relating to reactor demand limits, such as coolant pump state, feed pump state, maximum power, minimum power and the like, from reactor demand limits module 122, the unit reactor demand module producing an output signal relating to required reactor demand which is compared with a signal from a neutron power sensor 124 at a comparator 126. The output from comparator 126 is supplied through a dead band controller 128 to a rod control system 130 which controls operation of the reactor 54. The servo-type rod control for the reactor is conventional.

The feedwater control subsystem 104 includes a temperature sensor 132 coupled with the hot coolant outlet pipe 56 from the reactor to produce a temperature signal $T_{H1}$ representative of the temperature of the hot coolant and a temperature sensor 134 coupled with cold coolant inlet pipe 64 to the reactor to produce a temperature signal $T_{C1}$ representative of the temperature of the cold coolant. The signals $T_{H1}$ and $T_{C1}$ are supplied to a comparator 136 which supplies a difference signal $\Delta T_1$ ($T_{H1}-T_{C1}$) to a multiplier 138 which receives as a second input the output $WC_p/QSGO$ of a flow signal synthesizer 140 that receives inputs from sensors 142, 142' responsive to circuit breaker positions of coolant pumps 68, 68', respectively. Multiplier 138 supplies an output signal $WC_p \Delta T_1/QSGO$ to an adder 146. The temperature signals $T_{H1}$ and $T_{C1}$ are also supplied to an adder 148 which has an output equal to $T_{H1}+T_{C1}$ supplied to a scaler 150 which effectively divides by two to produce an output equal to $T_{AVE1}$. The signal $T_{AVE1}$ is compared with the average temperature setpoint $T_{SET}$ from 152 at a comparator 154, the output of the comparator 154 being supplied to a circuit 156 producing an output equal to $K_f(E_t+T_t\,d/dt(E_t))$ where $K_f$ is the gain of average temperature component of demand per unit/°F., $E_t$ equals $T_{SET}-T_{AVE1}$, $T_t$ is a derivative time constant to offset the time constant used in measuring $T_{H1}$ and $T_{C1}$ and to offset the thermal capacity of the coolant and $d/dt(E_t)$ is the time derivative of $E_t$. The output signal from circuit 156 is supplied to adder 146 to produce a feedwater demand output signal WFWD equal to $WC_p\,\Delta T/QSGO + K_f(E_t+T_t\,d/dt(E_t))$ supplied to a comparator 158 which also receives a signal $W_{FW1}$ equal to actual feedwater flow from a sensor 160 sensing flow in feedwater inlet pipe 74. The difference or feedwater flow error signal from comparator 158 is used in conventional manner to control feedwater regulating valves 76 and 78 via a proportional plus integral controller system including an integrator 162, an auctioneer (or high select) circuit 164 and a valve position controller 166. A low level limit is set at 168 to supply an input to a comparator 170 for comparison with a level signal $L_l$ from a sensor 172 responsive to fluid level in steam generator 60, the output of the comparator 170 being supplied through a gain circuit 174 to auctioneer circuit 164 such that the need to maintain a minimum fluid inventory in steam generator 60 overrides the feedwater control based on reactor coolant average temperature. In similar fashion, a high level limit override (not shown) can be provided, as is conventional, to protect against flooding of steam aspirating holes in the steam generator; however, as noted above, it is referred that the operator respond to a high level alarm to reduce reactor power.

The feed pump speed control 106 includes a differential pressure sensor 175 connected across feedwater regulating valve 76 to generate a signal $DP_1$ which is supplied to a low select or auctioneer circuit 176 along with a signal $DP_2$ generated by a differential pressure sensor 177 connected across feedwater regulating valve 84. Low select circuit 176 supplies the lowest of signals $DP_1$ and $DP_2$ to a comparator 178 which also receives a setpoint signal DP from 180, the error signal from comparator 178 corresponding to feed pump speed demand supplied via a gain circuit 181 to a high select or auctioneer circuit 182 which also receives a signal corresponding to minimum feed pump speed from a circuit 183. The high select circuit 182 supplies the higher of the feed pump speed signals to a governor 184 controlling a governor valve 186 to control the turbine driving pump 72 via feedback 187 in response only to the differential pressure across the feedwater regulating valves.

The feedwater control subsystem 108 is used in conjunction with steam generator 62 and includes the same components as feedwater control subsystem 104 with the exception that feed pump speed control subsystem 110 includes an adder 188 receiving the feed pump speed signal from high select circuit 182 and a speed bias signal from a circuit 189 to produce a speed demand signal supplied to the governor of feed pump speed control 110. Accordingly, components of feedwater control subsystem 108 identical to those of feedwater control subsystem 104 are not described herein for the sake of brevity.

In operation of the feed pump speed controls 106 and 110, the lower differential pressure signal from sensors 175 and 177 ($DP_1$ or $DP_2$) is supplied by low select circuit 176 to comparator 178 to produce a signal proportional to feed pump speed demand, the feed pump speed demand signal being low-limited relative to a minimum feed pump speed via high select circuit 182 such that feed pump speed never falls below a set minimum value equivalent to the feed pump speed required at and below 30% power. In this manner, stability problems during low flow conditions are minimized in that the feed pump controls do not rely on differential pressure signals where such differential signals vary greatly with small changes in feed pump speed or regulating valve position. The speed bias signal causes the feed pumps to operate at slightly different speeds.

The steam demand turbine control subsystem 112 includes a comparator 190 receiving a turbine steam pressure setpoint signal from 191 and a pressure signal $P_H$ from a sensor 192 sensing pressure in turbine header 95 and supplying an output signal to a pulser 194 which controls the position of a speed changer motor for the main turbine 90, the speed changer motor including a governor 196 controlling turbine governor valve 100 and receiving a feedback signal from the turbine output The turbine bypass control loop 116 is responsive to turbine header pressure and includes a comparator 198 receiving turbine header pressure signal $P_H$ from sensor 192 and a turbine bypass setpoint input from 202 responsive to a turbine and reactor state circuit 204 which produces a signal representative of the operating condition of the plant, eg., reactor tripped. The output of comparator 198 is supplied via a constant gain 206 to a positioner 208 to control turbine bypass valve 99 such that, when turbine steam demand is not sufficient to exhaust steam supplied by steam generator 60, supplemental steam demand is supplied by the turbine bypass valve 99 which has a position proportional to deviation of turbine header steam pressure from setpoint varied dependent upon the operating condition of the plant.

The atmospheric dump valve control loops 114 and 115 provide separate control for dump valves 96 and 98 based on pressure error from once through steam generators 60 and 62, respectively, the control loops 114 and 115 being identical and only control loop 114 being described in detail. Atmospheric dump valve control loop 114 includes a pressure sensor 210 sensing steam pressure in outlet pipe 92 from once through steam generator 60 and supplying a signal $P_{SG1}$ to a comparator 212 which receives a steam outlet pressure setpoint from 214 and supplies a steam generator pressure error signal via a constant circuit 216 to a positioner 218 controlling dump valve 96. The setpoints in dump valve control loops 114 and 115 are higher than the turbine bypass setpoint such that dump valves 96 and 98 relieve the once through steam generators only.

The various setpoints are established using signal generators which generate an adjustable voltage proportional to the setpoint The turbine state (tripped/not tripped) is detected via an auxiliary relay which is energized or de-energized based on the operating state as is conventional.

During normal operation, a desired change in the power produced by the nuclear steam power plant can be effected by the operator increasing demand via manual input to unit reactor demand module 118. As long as the increased demand is within the reactor demand limits from module 122, an increased unit reactor demand signal will be supplied to comparator 126 for comparison with the actual power generated by reactor 54 as determined by sensing neutron flux at 124. The difference between reactor power demand and actual power will cause deadband controller 128 to withdraw rods via the rod control system 130 to cause an increase in neutron flux and, therefore, an increase in the actual power generated by the reactor 54. The rod withdrawal will continue until the reactor power (neutron flux) is balanced with the increased reactor demand. In order to maintain a heat balance within the nuclear steam power plant, the increased thermal power generated by the reactor requires an increase in the power delivered by the steam generators, and the increased thermal power delivered by the reactor is determined by the feedwater control subsystem for each once through steam generator. More particularly, the temperate re difference, $\Delta T_1$, between the reactor coolant system hot and cold pipes 56 and 64 is determined via sensors 132 and 134 supplying signals $T_{H1}$ and $T_{C1}$ to comparator 136 and the temperature difference $\Delta T_1$ is multiplied by the coolant flow signal from flow signal synthesizer 140 to produce an output representative of thermal power delivered by the reactor 54 to steam generator 60. The thermal power delivered signal is utilized to control flow regulating valve 76 in the manner described above to create an increased feedwater flow demand. More particularly, the increased feedwater flow demand is compared at 158 with the actual feedwater flow rate supplied to the steam generator as measured by sensor 160 developing an actual feedwater flow rate signal $W_{FW1}$. The difference between the actual or measured feedwater flow and the feedwater flow demand is operated on by module 162 to produce an increase in the feedwater regulating valve position via valve positioner 166. Auctioneer module 164 assures that the set valve position will maintain a minimum fluid level in the steam generator as sensed by level sensor 172. In this manner, it will be appreciated that the feedwater regulating valve 76 will be opened to create an increased flow to match the thermal power delivered by the reactor coolant to the thermal power delivered by the steam generator to the downstream steam driven power plant.

The temporary deficiency in feedwater flow following increased power generated by reactor 54 will cause an increase in the average coolant temperature due to an increase in the thermal energy stored in the reactor coolant. The average temperature feedback loop of the feedwater control subsystem 104, composed of comparator 148, scaler 150, average temperature setpoint module 152, comparator 154 and module 156, corrects this deficiency in that, as previously described, the output of scaler 150 is representative of average temperature $T_{AVE1}$ which is compared with the average temperature setpoint $T_{SET}$ from module 152 and operated on in module 156 such that a signal is added to or subtracted from the thermal power delivered signal at adder 146, the signal being proportional to the deviation in average temperature and its time-rate-of-change. For example, if the average coolant temperature increased due to the thermal power delivered to the steam generator being temporarily higher than the thermal power delivered by the steam generator, feedwater flow would be boosted temporarily until the average coolant temperature was reduced to its setpoint.

While the steam flow response of the once through steam generator will eventually equal the feedwater flow, the steam pressure at which balance is achieved is essentially unconstrained; and, accordingly, steam pressure control is provided by the main turbine steam admission or governor valve 100. In the case of power increase, as presently discussed, the increased reactor power has caused an increase in feedwater flow to increase the thermal power delivered by each of the once through steam generators to the main turbine, and the increase in steam generator thermal power delivered causes an increase in steam header pressure $P_H$ as sensed by sensor 192. The difference between the steam header pressure and the setpoint from module 191 is determined by comparator 190, and the output of comparator 190 causes pulser 194 to operate the speed changer motor of the turbine governor thereby opening the turbine steam admission valve 100. In this manner the turbine steam admission valves are opened until the increased valve opening restores steam header pressure to the setpoint. The increased opening of the turbine steam admission valve leads to an increase in the electrical power delivered by the turbine generator to an electrical grid. The nuclear steam power plant has, thus, reached a new equilibrium wherein the increase in reactor power demand input to module 118 has produced the desired result, that is, an increase in electrical power generated, with average coolant temperature and steam pressure maintained at their respective setpoints.

If the operator decreases demand during normal operation, the control system will respond in a similar manner to that described above to match the reduced thermal power delivered by the reactor.

The coordinated control system of the present invention operates in substantially the same manner in off-normal situations as described above under normal conditions. The most common types of upsets in nuclear steam power plants are deficiencies in the flow capacity of the feedwater/condensate pumping system relative to the thermal power produced by the plant, deficiencies in the flow capacity of the reactor coolant pumping system relative to the thermal power produced by the plant, turbine trips (sudden closures of the turbine steam admission valves, automatically initiated usually for the purpose of protecting the turbine generator from damage), and reactor trips (a sudden, automatically initiated insertion of control rods causing neutron flux and therefore thermal power to diminish to a residual level of a few percent of rating usually for the purpose of protecting the reactor core from damage).

In the case of deficiencies in the flow capacity of the feedwater/condensate pumping system, deficiencies in the flow capacity of the reactor coolant pumping system and turbine trips, the response of the coordinated control system is to limit, automatically, the power generated by the reactor to a level commensurate with the then-prevailing feedwater system and coolant system pumping configuration and turbine generator operating condition, inserting control rods if it is necessary to reduce reactor power to achieve such a level. The control subsystems for feedwater and steam demand then automatically and independently adjust the operating conditions to values consistent with the limited reactor power available. More particularly, if one of the two feedwater pumps trips, reactor power is automatically limited to a value of approximately 65% which corresponds to the nominal flow capacity of the remaining feedwater pump, reactor power being limited due to the reactor demand limits supplied to unit reactor demand 118 which reduces the reactor demand supplied to the comparator 126 causing the rod control system to adjust the power generated by the reactor in the manner described above. If the nuclear steam power plant is at high power (about 95 to 100%), the feedwater regulating valves will be opened, as described above, to match the thermal power delivered by the reactor; however, due to the deficiency in feed pumping capacity, in the short term the demand will not be matched; nevertheless, with the feedwater regulating valves opened wide, feedwater flow is maximized in the then-existing feedwater pumping configuration. Eventually, the insertion of control rods produced by the automatic power limiting from reactor demand limits module 122 will cause the thermal power delivered to fall within the feedwater pumping capability. At this time the control of the feedwater regulating valve position will again regulate feedwater flow, trimming the feedwater flow to restore loop average coolant temperatures to selected values. In the interim, the automatic control of steam demand controls steam pressure to the setpoint, the control being "loose" such that steam flow is gradually reduced to a value commensurate with the existing feedwater flow. The gradual reduction of steam flow minimizes the reactor power, steam generator power mismatch and thereby limits the reactor pressure transient associated with the upset.

The operation of the coordinated control system when a reactor coolant pump trips is similar to that described above with respect to tripping of a feedwater pump. If four coolant pumps, as shown, are initially operating and one of the coolant pumps trips, the thermal power delivered to one steam generator will differ from the thermal power delivered to the other steam generator, it being noted that due to the operation of the flow signal synthesizer module 140 in each feedwater control subsystem, the feedwater flow to each steam generator matches the thermal power delivered to that steam generator.

In the case of a turbine trip, the main turbine steam admission valves 100 are not available for their normal function of controlling steam demand. Accordingly, the turbine bypass valve 99 and the dump valves 96 and 98 are utilized to control steam demand. Dependent upon the initial power level, the turbine bypass and dump valves may be supplemented by steam safety valves. A turbine trip causes reactor power to be automatically reduced to a level that produces an amount of steam within the capability of the turbine bypass valve to dissipate.

In the case of a reactor trip, there is no need to reduce reactor power automatically. The feedwater control subsystems operate as in normal operation described above in that the feedwater flows to the once through steam generators are automatically diminished as the thermal power delivered to each steam generator falls. When steam generator secondary water inventory is depleted to the low level limit as sensed by sensor 172 and compared with the low level limit from module 168, the transition to automatic control of feedwater based on steam generator level is made via the operation of the valve position demand auctioneer 164 for the feedwater regulator valve.

Most reactor trips produce an automatic turbine trip such that control of steam demand following a reactor trip is effected by the turbine bypass valve, the atmospheric dump valves and, if necessary to dissipate surplus energy, steam safety valves. The steam pressure setpoint following a reactor trip is automatically set to a higher value than the steam pressure setpoint utilized for normal operation thereby minimizing the reduction in average coolant temperature following a reactor trip and limiting the reduction in reactor coolant pressure to avoid overcooling of the primary system.

From the above, it will be appreciated that, contrary to prior art integrated control subsystems, any one process variable out of bounds indicates to the operator that a unique control subsystem is malfunctioning in a clear and simple manner such that the operator can take appropriate action in a timely manner to keep the plant on line. Failure of a single process variable detector, control module or power supply will not disrupt the operation of more than one control subsystem; and thus, the severity of control system—induced feedwater system upsets will be limited to failure of one of the control subsystems for feedwater control and the operator will be required to take manual control of only the one failed control subsystem in the event of a failure. Not only are the different process control subsystems independent, but similar process control subsystems are independent of each other such that, for example, a single failure in feedwater control subsystem 104 will not affect feedwater control subsystem 108.

While the control system of the present invention and the control subsystems thereof can be implemented in any conventional manner using analog or digital techniques, specific schematic diagrams therefor are illustrated in FIGS. 3 through 16, it being noted that the schematic diagrams are exemplary only.

The reactor control subsystem 102 is shown in FIGS. 3 through 8 and includes a memory module R1, Bailey Part No. 6624520-2, for establishing reactor demand such that, in manual operation, demand is established via increasing or decreasing a pushbutton switch and, in automatic operation, a memory tracks neutron power or output versus a rate limiter. A signal generator R2, Bailey Part No. 6623835-2, provided a $-25\%/\text{min}$ rate selected when reactor power demand is greater than the operator set maximum power, and a signal generator R3, Bailey Part No. 6623835-2, provides a $+25\%/\text{min}$ rate selected when reactor power demand is less than the operator set low power limit. A potentiometer R4 allows the operator to set the rate of change. A signal limiter R5, Bailey Part No. 6624261-1, provides a + or $-5\%/\text{min}$ rate selected when reactor power is greater than 90% and increases or reactor power is less than 28% and a signal generator R6, Bailey Part No. 6623835-3, provides a $-50\%/\text{min}$ rate selected for reactor coolant pump limit, feedwater pump limit or turbine-generator trip. A rate limiter R7, Bailey Part No. 6624200-1, limits the rate of change in reactor power demand with the output at pin 7 being the previous value plus the integrated value of pin 12. A signal lag unit R8, Bailey Part No. 6624120-1, provides rate of change signal filtering, and a summer and invertor R9, Bailey Part No. 6623695-2, provides gain and inverts a rate of change signal, and a signal monitor R10, Bailey Part No. 6623819-1, determines if reactor power demand increases or decreases. A signal monitor R11, Bailey Part No. 6623819-1, determines if reactor power demand is less than 28% and more than 90%, while a signal monitor R12, Bailey Part No. 6623819-1, determines if reactor power demand is greater than 75% and greater than 103%. A signal monitor R13, Bailey Part No. 6623819-1, determines if reactor power demand is greater than 65% and greater than 55%. A potentiometer R14 allows the operator to set maximum reactor power demand. A summer R15, Bailey Part No. 6623695-1, provides gain of the signal from the operator to set the maximum allowable reactor power demand. A tristable relay R16, Bailey Part No. 6623817-1, determines if reactor power demand is greater than the operator set maximum demand. A signal generator R17, Bailey Part No. 6623835-2, generates a signal representative of operator imposed demand limits. A potentiometer R18 allows the operator to set minimum allowable reactor power demand. A summer R19, Bailey Part No. 6623695-1, provides gain of the signal from the operator to set minimum reactor power demand. A tristable relay R20, Bailey Part No. 6623817-1, determines if reactor power demand is less than the operator set minimum demand. A summer and invertor R21, Bailey Part No. 6623695-2, establishes neutron error based on neutron power and reactor power demand, and a signal lag unit R22, Bailey Part No. 6624120-1, provides signal delay for neutron power measurements to minimize reactor control oscillations. A summer R23, Bailey Part No. 6623695-1, converts the 0 to 10 volts D.C. neutron power signal to $+/-10$ volts D.C. A summer R24, Bailey Part No. 6623695-1, provides a neutron error signal. A tristable relay R25, Bailey Part No. 6623817-1, determines when neutron error signal is greater than $+1\%$ or less than $-1\%$, and a tristable relay R26, Bailey Part No. 6623817-1, determines when the neutron error signal is greater than $+0.25\%$ or less than $0.25\%$. A signal monitor R27, Bailey Part No. 6623819-1, detects if neutron power is greater than 60% and less than 50%.

Figure 10:
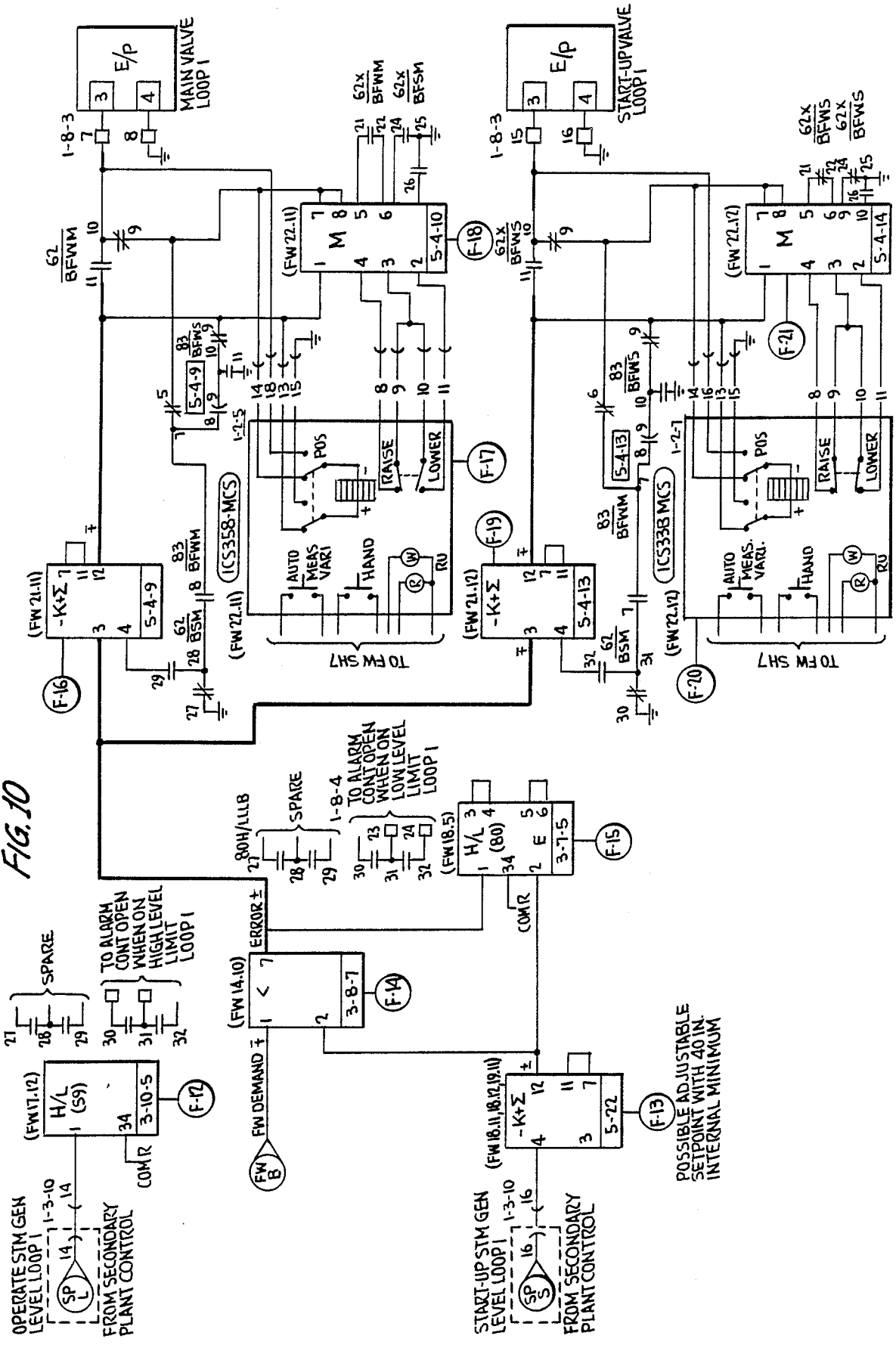

The feedwater control subsystems are illustrated in FIGS. 9, 10 and 11 and include a signal generator F1, Bailey Part No. 6623835-3, providing a signal representing 2RCP/loop (two reactor coolant pumps per loop) flow, a signal representing ORCP/loop flow and a signal representing 1RCP/loop flow. A summer and inverter F2, Bailey Part No. 6623695-2, compares $T_{AVE}$ with $T_{AVE}$ setpoint ($T_{SET}$) to produce an error signal $E_T$. A multiplier F3, Bailey Part No. 6624-080-1, multiplies the RCP flow signal by $T_H - T_C$ to produce a synthesized reactor power signal. Hand/auto station F4 provides a variable $T_{AVE}$ setpoint and display for either $T_{AVE}$ or flow error. A derivative circuit F5, Bailey Part No. 6624125A1, produces a derivative of the $T_{AVE}$ error signal (d/dtE$_T$). A summer and inverter F6, Bailey Part No. 6623695-2, provides gain and sum of E$_T$ and d/dtE$_T$ signals. A signal lag circuit F7, Bailey Part No. 6624120-1, filters the temperature compensated main feedwater flow signal. A summer and inverter F8, Bailey Part No. 6623695-1, provides the sum (E$_T$+d/dtE$_T$) and the synthesized reactor power signals to produce the feedwater demand signal. A signal monitor F9, Bailey Part No. 6623819-1, provides a signal limiter function to activate an alarm when $T_{AVE}$ error goes out of bounds. A summer and inverter F10, Bailey Part No. 6623695-2, compares the temperature compensated loop main feedwater flow signal with the feedwater demand to produce the feedwater flow error signal. A summer and proportional and integral circuit F11, Bailey Part No. 6624151A2, is a proportional and integral controller providing a control signal proportional to the feedwater flow error and the integral of the feedwater flow error. A signal monitor F12, Bailey Part No. 6623819-1, is a signal limiter to activate an alarm when the fluid level in the steam generator is above a high level limit. A summer and invertor F13, Bailey Part No. 6623695-2, compares the start-up steam generator level with the low level setpoint and operates on the error signal produced to provide a proportional low level control signal. An auctioneer F14, Bailey Part No. 6624543-1, chooses the output of the proportional and integral controller or the proportional low level control signal depending on which signal is the most negative and results in greater feedflow. A tristable relay F15, Bailey Part No. 6623817-1, compares the signal chosen by the auctioneer with the proportional low level control signal, and if the resulting signal is zero, contacts open to activate a low level limit alarm and contacts close to energize a relay that short circuits the integral portion of the proportional and integral flow controller to prevent integral wind-up when feedwater is controlled by the proportional low level control signal A summer and inverter F16, Bailey Part No. 6623695-2, provides smooth transfer of the main feedwater valve from manual to automatic operation. Hand/auto station F17 provides transfer between automatic and manual operation of the main feedwater valve, means for manually controlling the position of the main feedwater valve, displays, during manual operation, "meas. var."—the difference between the automatic and manual main feedwater valve position demand signals—and "pos"—the manual valve position demand signal input to the main feedwater valve, and displays, during automatic operation, "meas. var."—the difference between the input and output of the analog memory module—and "pos"—the automatic valve position demand signal input to the main feedwater valve. An analog memory F18, Bailey Part No. 6624520-1, during automatic operation, tracks the automatic valve position demand signal to provide bumpless automatic to manual transfer of the main feedwater valve and, during manual operation, provides the manual valve position demand signal and changes the signal if the "increase" or "decrease" contacts on the hand/auto station are closed. A summer and inverter F19, Bailey Part No. 6623695-2, provides smooth transfer of the start-up feedwater valve for manual to automatic operation. A hand/auto station F20 provides transfer between automatic and manual operation of the start-up feedwater valve, provides a means for manually controlling the position of the start-up feedwater valve and, during manual operation, displays "meas. var" —the difference between the automatic and manual start-up feedwater valve position demand signals and "pos"—the manual valve position demand signal input to the start-up feedwater valve—and, during automatic operation, displays "meas. var"—the difference between the input and output of the analog memory module—and "pos"—the automatic valve position demand signal input to the start-up feedwater valve. An analog memory F21, Bailey Part No. 6624520-1, during automatic operation, tracks the automatic valve position demand signal to provide bumpless automatic to manual transfer of the start-up feedwater valve and, during manual operation, provides the manual valve position demand signal and changes the signal if the "increase" or "decrease" contacts on the hand/auto station are closed.

Figure 12:
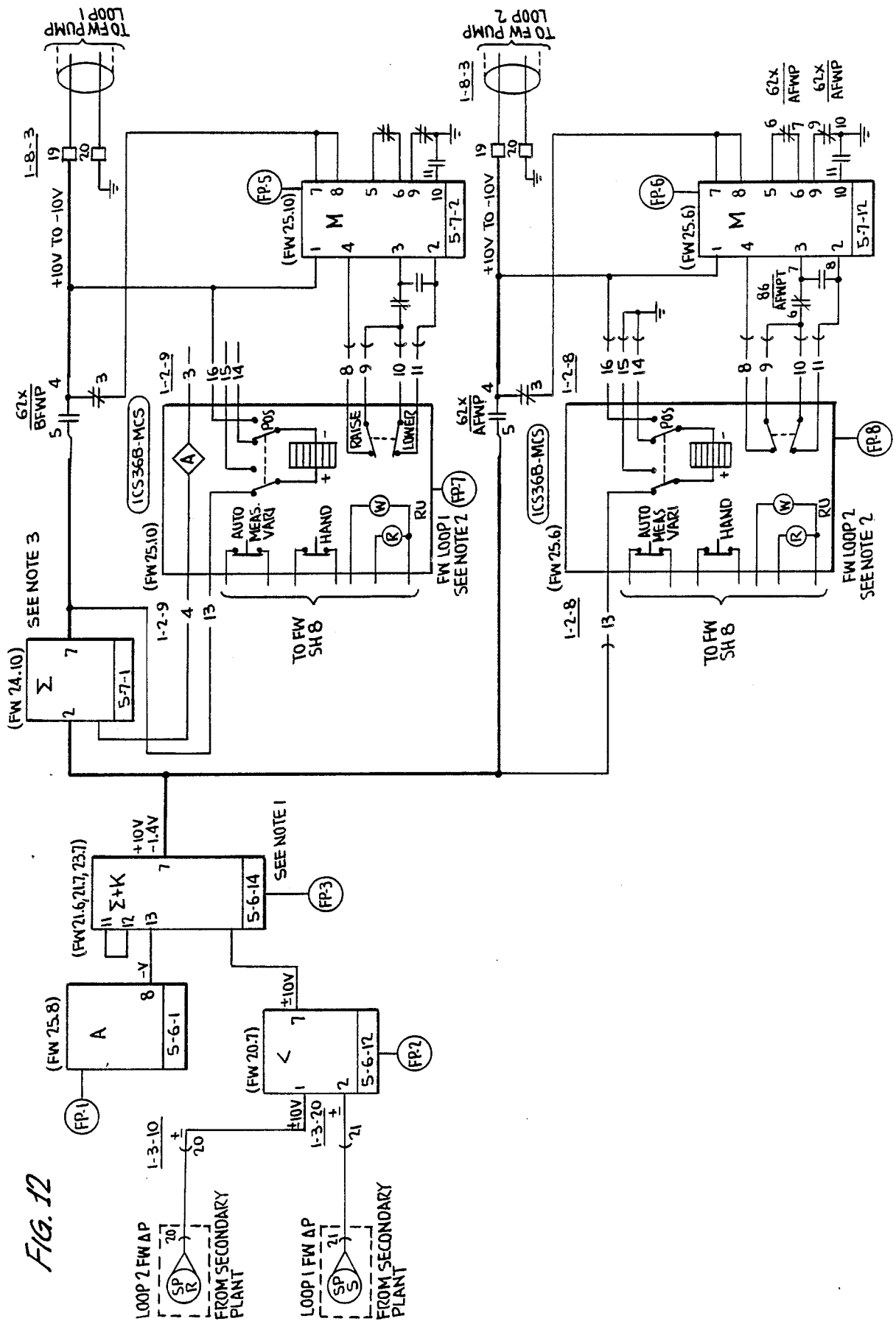
FIG. 12 is a schematic diagram of circuitry for the feed pump speed control of the control system of the present invention.

The feed pump speed controls 106 and 110 are shown in FIG. 12 and include a signal generator FP1 generating a negative voltage representing a low limit for feed pump speed demand. A two input auctioneer FP2, Bailey Part No. 6624543-1, selects the lower of the pressure difference signals DP1 or DP2. A summer, bias, proportional and integral circuit FP3, Bailey Part No. 6624151-1, which does not use the integrating function, compares the differential pressure signal from auctioneer FP2 to bias and then provide a low limits output. A summer FP4 adds the speed bias to the demand signal for feed pump 80. An analog memory FP5, 6, Bailey Part No. 6624520-1, provides a manual pump demand signal when in manual operation and tracks the automatic signal for smooth transfer to manual. A hand/auto control station FP7 provides automatic/manual transfer capability and includes a signal generator for the speed bias signal. A hand/auto control station FP8 provides automatic/manual transfer capability for feed pump 72.

Figure 13A:
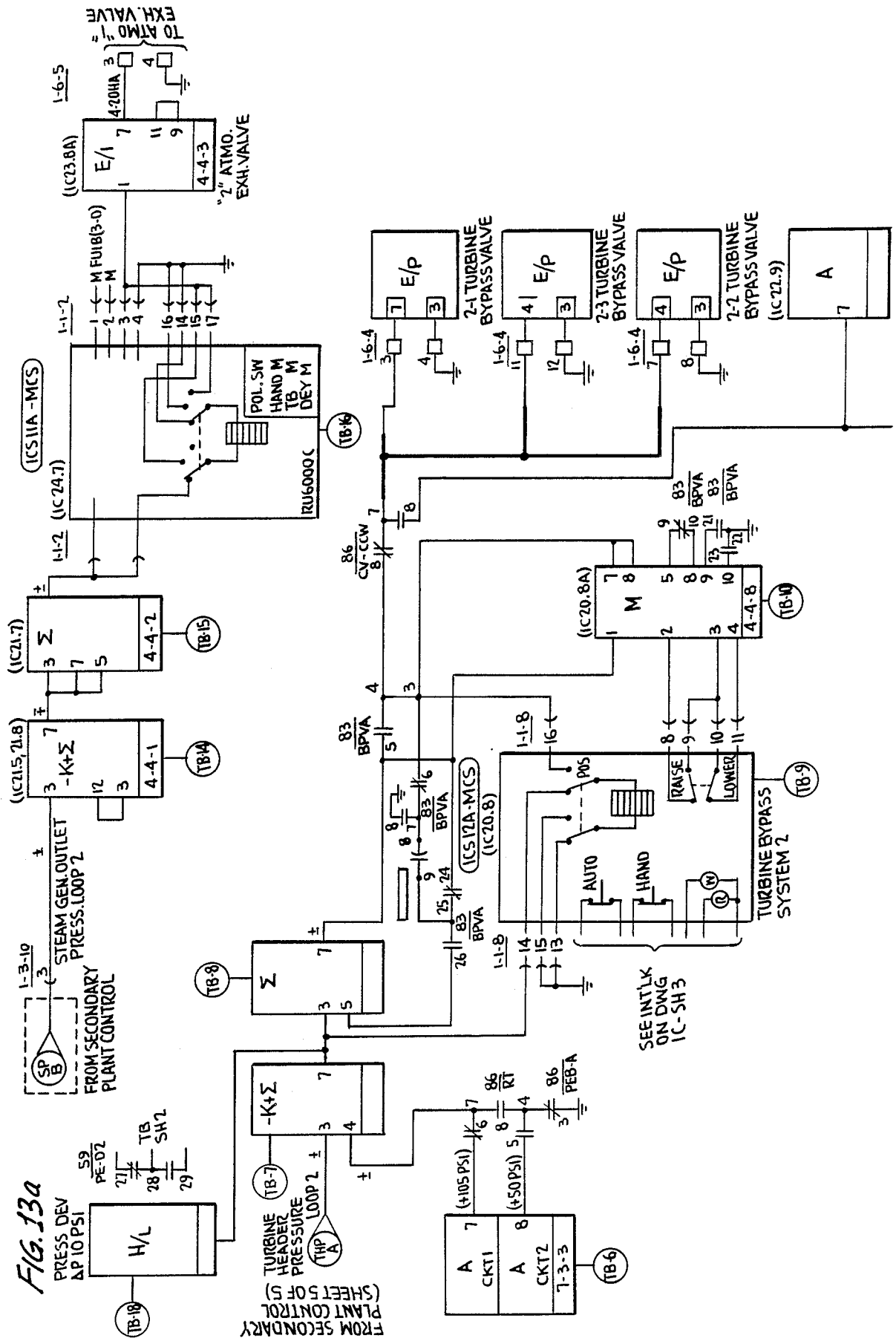
FIGS. 13(a,b) and 14(a–c) are schematic diagrams of circuitry of the turbine bypass control of the control system of the present invention.
Figure 14A:
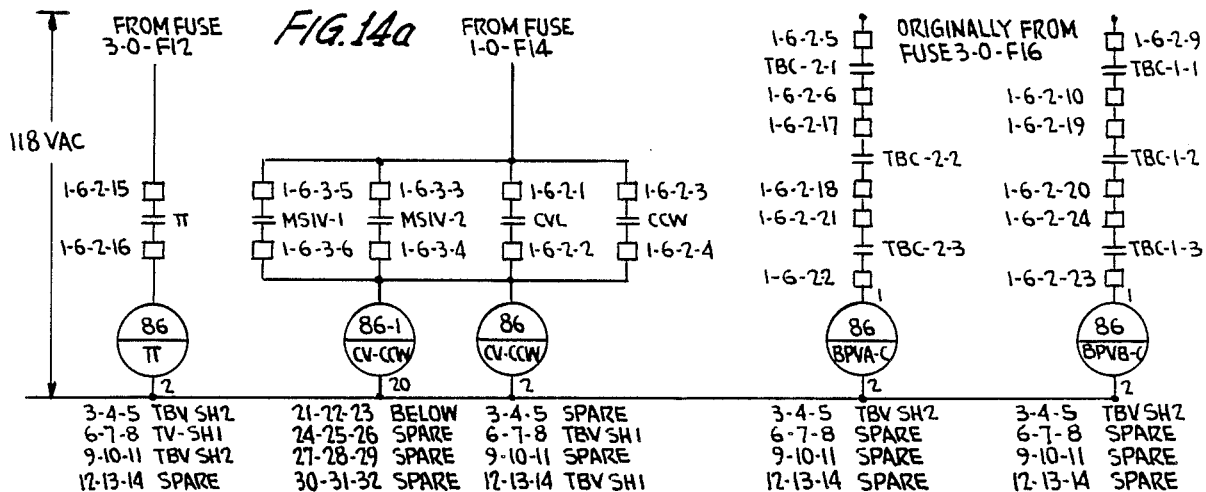
Figure 14B:
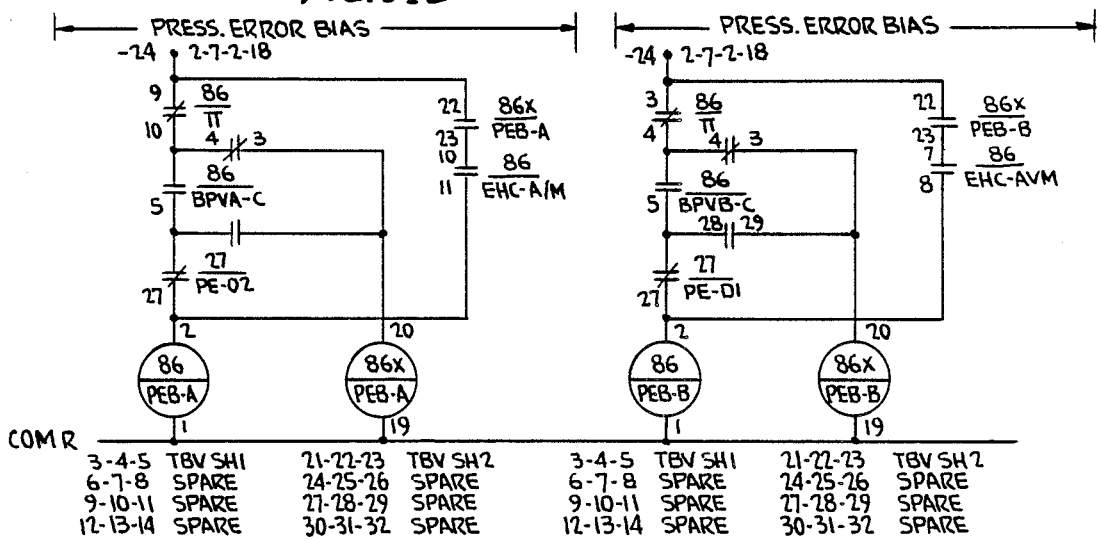
Figure 14C:
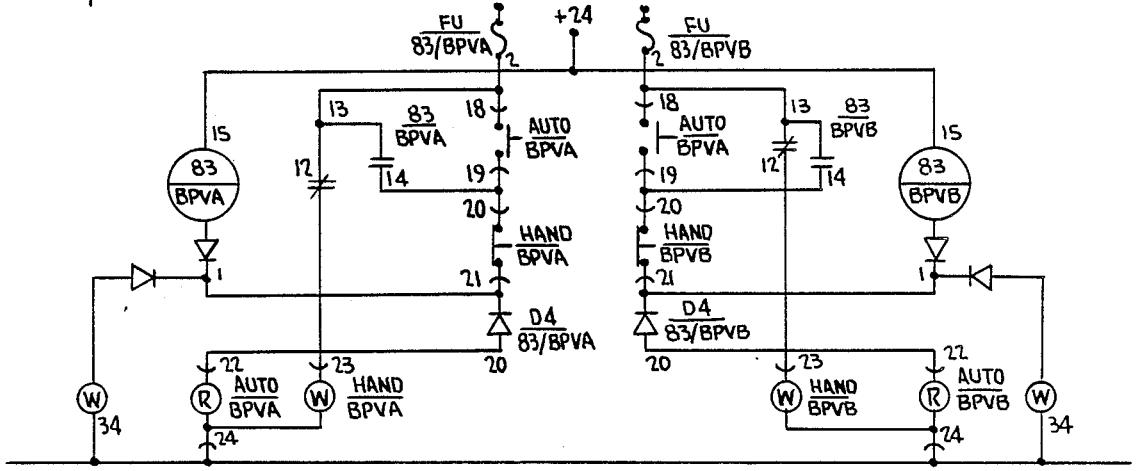

The turbine bypass control is illustrated in FIGS. 13 and 14 including two turbine header pressure bypass controls referred to as loop 1 and loop 2 rather than the single loop 112 shown in FIG. 2. A signal generator TB1, Bailey Part No. 6623835-2, provides turbine header pressure error bias signals to the loop 1 turbine bypass control producing 105 psi bias for post reactor trip to prevent overcooling and 50 psi bias to provide positive valve seating. A summer and inverter PB2 Bailey Part No. 6623695-2, provides the turbine header pressure setpoint of 870 psig and compares the loop 1 turbine header pressure with the setpoint to produce a loop 1 turbine header pressure error signal. A summer and inverter TB3, Bailey Part No. 6623695-1, provides proportional gain for the loop 1 turbine header pressure error signal to produce the loop 1 turbine bypass valve position demand signal while the tie-back circuit is used to provide bumpless transfer from manual to automatic operation. A hand/auto station TB4, provides transfer between automatic and manual operation of the turbine bypass valves, provides a means for manually controlling the position of the loop 1 turbine bypass valve, during manual operation displays "meas. var"—the turbine header pressure error—and "pos"—the manual turbine bypass valve position demand signal and, during automatic operation displays "meas. var"—the turbine header pressure error—and "pos"—the automatic turbine bypass valve position demand signal. An analog memory TP5, Bailey Part No. 6624520-1, provides, during manual operation, the manual turbine bypass valve position demand signal and changes the signal if the "increase" or "decrease" contacts on the hand/auto station are closed and, during automatic operation, tracks the automatic turbine bypass valve position demand signal to provide smooth transfer of the loop 1 turbine bypass valve from automatic to manual. A signal generator TB6, Bailey Part No. 6623835-2, provides turbine header pressure error bias signals to the loop 2 turbine bypass control establishing 105 psi bias for post reactor trip to prevent overcooling and 50 psi bias to provide positive valve seating. A summer and inverter TB7, Bailey Part No. 6623695-2, provides the turbine header pressure setpoint of 870 psig and compares the loop 2 turbine header pressure with the setpoint to produce a loop 2 turbine header pressure error signal. A summer and inverter TB8, Bailey Part No. 6623695-1, provides proportional gain to the loop 2 turbine header pressure error signal to produce the loop 2 turbine bypass valve position demand signal while the tie-back circuit is used to provide bumpless transfer from manual to automatic operation. A hand/auto station TB9, provides transfer between automatic and manual operation of the turbine bypass valves, provides a means for manually controlling the position of the loop 2 turbine bypass valves, during manual operation, displays "meas. var"—the turbine header pressure error—and "pos'-'—the manual turbine bypass valve position demand—and, during automatic operation, displays "meas. var"—the turbine header pressure error—and "pos'-'—the automatic turbine bypass valve position demand. An analog memory TB10, Bailey Part No. 662450-1, provides, during manual operation, the manual turbine bypass valve position demand signal and changes the signal if the "increase" or "decrease" contacts on the hand/auto station are closed and, during automatic operation, tracks the automatic turbine bypass valve position demand signal to provide smooth transfer of the loop 2 turbine bypass valves from automatic to manual. A summer and inverter TB11, Bailey Part No. 6623695-2, provides the steam generator pressure setpoint and compares the pressure from steam generator 60 with the setpoint to produce a pressure error signal SG1. A summer and invertor TB12, Bailey Part No. 6623695-1, provides proportional gain of the SG1 pressure error signal to produce the loop 1 atmospheric exhaust valve position demand signal. A hand/auto station TB13 provides a means for manual operation of the loop 1 atmospheric exhaust valve. A summer and inverter TB14, Bailey Part No. 6623695-2, provides the steam generator pressure setpoint for steam generator 62 and compares the steam generator pressure with the setpoint to produce a pressure error signal SG2. A summer and inverter TB15, Bailey Part No. 6623695-1, provides proportional gain for the SG2 pressure error signal to produce the loop 2 atmospheric exhaust valve position demand signal. A hand/auto station TB16 provides a means for manual operation of the loop 2 atmospheric exhaust valve. A signal monitor TB17, Bailey Part No. 6623819-1, is a signal limiter activating an alarm when header pressure deviates high over 10 psi in loop 1. A signal monitor TB18, Bailey Part No. 6623819-1, is a signal limiter that activates an alarm when header pressure deviates high over 10 psi in loop 2.

The turbine throttle valve control subsystem 112 is illustrated in FIGS. 15 and 16. A hand/auto station T1 provides the adjustable turbine header setpoint and displays the turbine header pressure. A summer and inverter T2, Bailey Part No. 6623695-1, compares the turbine header pressure with the setpoint and produces an error signal. A pulser T2, Bailey Part No. 6625160-1, receives the turbine header pressure error signal and closes one of two pairs of contacts connected to the EHC, closing one pair causing the throttle valve to close and closing the other pair causing the throttle valve to open. A signal monitor T4, Bailey Part No. 6623819-1, has relay contacts that change state when the turbine header pressure is 50 psi greater than the setpoint.

From the above, it will be appreciated that the control system of the present invention responds to a single power demand input supplied only to the reactor control subsystem to control operation of the reactor, the once through steam generators and the turbine in that the once through steam generators respond to the thermal power delivered thereto by the reactor to produce a matching thermal power in the form of steam supplied to the turbine and the turbine responds to steam supplied by the once through steam generators to produce a matching speed. That is, no arbitrary input signals dependent upon the power demand input are supplied to the feedwater control subsystem or the turbine steam demand control subsystem but rather each control subsystem responds only to actual plant process operation, the once through steam generators being controlled in accordance with thermal power delivered by the reactor and the turbine being controlled in accordance with thermal power (steam) delivered by the once through steam generators. In this manner, the nuclear steam power plant is always maintained in energy balance, and the various setpoints (e.g., turbine steam pressure setpoint, average coolant temperature setpoint, turbine bypass pressure setpoint, steam outlet pressure setpoint and differential pressure setpoint) are established independent of the power demand input and remain stable during operation of the nuclear steam power plant in normal and off-normal conditions.

Inasmuch as the present invention is subject many variations, modifications and changes in detail, it is intended that the subject matter discussed above and shown in the accompanying drawings be interpreted as illustrative and not in a limiting sense.

What is claimed is:

1. A control system for a nuclear steam power plant having a nuclear reactor, a once through steam generator, means circulating coolant between the nuclear reactor and the once through steam generator including a hot coolant pipe, a cold coolant pipe and coolant pump means, means supplying feedwater to the once through steam generator including feedwater flow regulating means for controlling the amount of steam supplied to through steam generator, a turbine driven by steam generated by the once through steam generator and means supplying steam from the once through steam generator to the turbine including governor valve means for controlling the amount cf steam supplied to the turbine, said control system comprising a reactor control subsystem including reactor demand means for receiving an input from an operator representative of a selected power demand for the nuclear steam power plant and producing an output representative of reactor demand required to achieve said selected power demand for the nuclear steam power plant, rod control means responsive to said reactor demand output from said reactor demand means to control operation of the nuclear reactor, and reactor demand limit means supplying an input to said reactor demand means to limit said reactor demand output;

a feedwater control subsystem independent of said reactor control subsystem including means for controlling the feedwater flow regulating means to control the flow of feedwater supplied to the once through steam generator, temperature sensing means for sensing the temperature of coolant in the hot coolant pipe and the temperature of coolant in the cold coolant pipe, means for sensing operation of the coolant pump to produce a coolant flow signal, and computing means responsive to the difference in the coolant temperatures in the hot coolant pipe and the cold coolant pipe and to said coolant flow signal to produce a thermal power delivered output signal for controlling the feedwater flow regulating means such that the flow of feedwater to the once through steam generator is controlled in response to the thermal power delivered by the nuclear reactor; and a turbine steam demand control subsystem independent of said reactor control subsystem and said feedwater control subsystem including pressure sensing means for sensing steam pressure in the means for supplying steam to the turbine, means providing a turbine steam pressure setpoint and means responsive to deviation of said steam pressure from said turbine steam pressure setpoint for controlling the governor valve means to maintain said steam pressure substantially at said turbine steam pressure setpoint and for controlling the turbine in response to steam generated by the once through steam generator whereby said feedwater control subsystem controls feedwater flow to match the thermal power delivered by the once through steam generator to the thermal power delivered by the nuclear reactor, independent of said reactor control subsystem by controlling the feedwater flow regulating means and said turbine steam demand control subsystem controls the turbine in accordance with said steam pressure independent of said reactor control subsystem and said feedwater control subsystem.

2. A control system for a nuclear steam power plant as recited in claim 1 wherein said feedwater control subsystem includes means responsive to said temperature sensing means for producing a compensation signal representative of the deviation of the average temperature of the coolant in the hot and cold coolant pipes from an average coolant temperature setpoint and the time-rate-of-change of said average temperature deviation and means for combining said compensation signal with said thermal power delivered output signal to produce a feedwater flow demand signal for controlling the feedwater flow regulating means whereby deviations in average coolant temperature caused by increased or decreased thermal power delivered by the reactor will temporarily increase or decrease feedwater flow until average coolant temperature returns to said average coolant temperature setpoint.

3. A control system for a nuclear steam power plant as recited in claim 2 wherein the nuclear steam power plant includes a plurality of once through steam generators each having feedwater flow regulating means for controlling feedwater supplied thereto and the coolant circulating means includes hot and cold coolant pipes and coolant pump means for each once through steam generator and wherein said control system includes a plurality of said feedwater control subsystems, each coupled with a single once through steam generator and the coolant circulating means and feedwater flow regulating means therefor such that the once through steam generators are controlled independently of each other and independent of said reactor control subsystem.

4. A control system for a nuclear steam power plant as recited in claim 3 wherein the once through steam generators have steam outlets and the means supplying steam from the once through steam generators to the turbine includes a header communicating with the steam outlets of the once through steam generators and the governor valve means and wherein said pressure sensing means in said turbine steam demand control subsystem senses steam pressure in the header.

5. A control system for a nuclear steam power plant as recited in claim 4 wherein said turbine steam demand control subsystem includes a turbine bypass control means including turbine bypass valve means communicating with the header, means providing a turbine bypass pressure setpoint and means comparing said steam pressure sensed in the header with said turbine bypass pressure setpoint to control said turbine bypass valve means to maintain steam pressure in the header at or below said turbine bypass pressure setpoint.

6. A control system for a nuclear steam power plant as recited in claim 5 wherein said turbine bypass pressure setpoint is controlled in accordance with the operating conditions of the reactor and the turbine.

7. A control system for a nuclear steam power plant as recited in claim 5 wherein said turbine steam demand control subsystem includes an atmospheric dump control means for each once through steam generator, each including pump valve means communicating with the steam outlet of the once through steam generator, means providing a steam outlet pressure setpoint greater than said turbine bypass pressure setpoint, means for sensing steam pressure in the steam outlet and means for comparing said sensed steam outlet pressure with said steam outlet pressure setpoint to control said dump valve means to maintain steam pressure in the steam outlet at or below said steam outlet pressure setpoint.

8. A control system for a nuclear steam power plant as recited in claim 7 wherein the feedwater flow regulating means for each once through steam generator includes regulating valve means controlled by said feedwater flow demand signal.

9. A control system for a nuclear steam power plant as recited in claim 8 wherein the feedwater flow regulating means for each once through steam generator includes feed pump means having a speed controlled in response to said feedwater flow demand signal.

10. A control system for a nuclear steam power plant as recited in claim 9 wherein each of said feedwater control subsystems includes means for sensing the differential pressure across said regulating valve means, means providing a differential pressure setpoint and means comparing said sensed differential pressure with said differential pressure setpoint to control said feed pump means.

11. A control system for a nuclear steam power plant as recited in claim 10 wherein said turbine steam pressure setpoint, said average temperature coolant setpoint, said turbine bypass pressure setpoint, said steam outlet pressure setpoint and said differential pressure setpoint are established independent of the operator selected power demand for the nuclear steam power plant.

12. A control system for a nuclear steam power plant as recited in claim 1 wherein the means for supplying steam from the once through steam generator to the turbine includes a header and said turbine steam demand control subsystem includes a turbine bypass control means including turbine bypass valve means communicating with the header, means providing a turbine bypass pressure setpoint and means comparing said steam pressure sensed in the header with said turbine bypass pressure setpoint to control said turbine bypass valve means to maintain steam pressure in the header at or below said turbine bypass pressure setpoint.

13. A control system for a nuclear steam power plant as recited in claim 12 wherein the once through steam generator has a steam outlet communicating with the header and said turbine steam demand control subsystem includes an atmospheric dump control means for the once through steam generator including dump valve means communicating with the steam outlet of the once through steam generator, means providing a steam outlet pressure setpoint greater than said turbine bypass pressure setpoint, means for sensing steam pressure in the steam outlet and means for comparing said sensed steam outlet pressure with said steam outlet pressure setpoint to control said dump valve means to maintain steam pressure in the steam outlet at or below said steam outlet pressure setpoint.

14. A control system for a nuclear steam power plant as recited in claim 2 wherein the feedwater flow regulating means for the once through steam generator includes regulating valve means controlled by said feedwater flow demand signal.

15. A control system for a nuclear steam power plant as recited in claim 2 wherein the feedwater flow regulating means for the once through steam generator includes feed pump means having a speed controlled in response to said feedwater flow demand signal.

16. A control system for a nuclear steam power plant as recited in claim 2 wherein said feedwater control subsystem includes means for sensing actual feedwater flow and producing a signal corresponding thereto, and means for comparing said actual feedwater flow signal with said feedwater flow demand signal and controlling the feedwater flow regulating means in accordance with the difference between said actual feedwater flow signal and said feedwater flow demand signal.

17. A control system for a nuclear steam power plant as recited in claim 16 wherein said feedwater control subsystem includes means for sensing the level of fluid in the once through steam generator, means responsive to said level sensing means for producing a signal when a low level limit is sensed and auctioneer means receiving said low level limit signal and said difference between said actual feedwater flow signal and said feedwater flow demand signal to control said feedwater flow regulating means to prevent the level of fluid in the once through steam generator from dropping below said low level limit.

18. A control system for a nuclear steam power plant as recited in claim 2 wherein said feedwater flow demand signal is defined as $WC_p T/QSGO + K_f(E_t + T_t d/dt (E_t))$ where W is said coolant flow signal, $C_p$ is the specific heat of the coolant, T is the difference in the coolant temperatures in the hot coolant pipe and the cold coolant pipe, QSGO is the rated power of the once through steam generator, $K_f$ is the gain of average temperature component of demand, $E_t$ is the deviation of the average coolant temperature from the average coolant temperature setpoint, $T_t$ is the derivative time constant to offset the time constant of said temperature sensing means and $d/dt (E_t)$ is the time derivative of $E_t$.

19. A control system for a nuclear steam power plant having a nuclear reactor delivering thermal power to a once through steam generator, means supplying feedwater to the once through steam generator including feedwater flow regulating means, a turbine driven by steam from the once through steam generator and means controlling steam supplied to the turbine, said control system comprising a reactor control subsystem including reactor demand means for receiving an input representative of a selected power demand, means supplying reactor demand limits to said reactor demand means, said reactor demand means producing an output responsive to said selected power demand limited by said reactor demand limits, and rod control means responsive to said reactor demand output to control the reactor to produce thermal power corresponding to said reactor demand output;

a feedwater control subsystem including means for sensing the thermal power delivered by the reactor and controlling the feedwater flow regulating means to match the thermal power delivered by the once through steam generator to the thermal power delivered by the reactor; and a turbine steam demand control subsystem for sensing the steam pressure generated by the once through steam generator and controlling the steam controlling means to match turbine operation to steam pressure generated by the once through steam generator whereby operation of the reactor, the once through steam generator and the turbine is effected by a single input representative of selected power demand in that the once through steam generator is controlled in response to reactor operation and the turbine is controlled in response to once through steam generator operation.

20. A control system for a nuclear steam power plant as recited in claim 19 wherein the nuclear steam power plant includes a second once through steam generator with a second feedwater flow regulating means therefor, each of the once through steam generators having a steam outlet communicating with a header supplying steam to the turbine through governor valve means, and the reactor includes first and second coolant circulating means coupled with the first and second once through steam generators, respectively, and wherein said feedwater control subsystems for the first once through steam generator senses thermal power delivered by the reactor to the first once through steam generator by sensing coolant temperature in the first coolant circulating means and wherein said control system includes a second feedwater control subsystem including means for sensing thermal power delivered by the reactor to the second once through steam generator by sensing coolant temperature in the second coolant circulating means and controlling the second feedwater flow regulating means to match the thermal power delivered by the second once through steam generator to the thermal power delivered by the reactor to the second once through steam generator and wherein said turbine steam demand control subsystem senses steam pressure in the header to control said governor valve means to maintain steam pressure in the header substantially constant.

* * * * *